United States Patent
Woodward et al.

(10) Patent No.: US 12,244,339 B2
(45) Date of Patent: Mar. 4, 2025

(54) TRANSMITTER FOR A QUANTUM COMMUNICATION SYSTEM, A RECEIVER FOR A QUANTUM COMMUNICATION SYSTEM AND A METHOD OF CONTROLLING A QUANTUM COMMUNICATION SYSTEM

(71) Applicant: Kabushiki Kaisha Toshiba, Tokyo (JP)

(72) Inventors: Robert Ian Woodward, Cambridge (GB); Yuen San Lo, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 18/162,013

(22) Filed: Jan. 31, 2023

(65) Prior Publication Data
US 2023/0283370 A1    Sep. 7, 2023

(30) Foreign Application Priority Data
Mar. 7, 2022 (GB) ........................... 2203155

(51) Int. Cl.
| | |
|---|---|
| H04B 10/079 | (2013.01) |
| H04B 10/50 | (2013.01) |
| H04B 10/60 | (2013.01) |
| H04L 9/08 | (2006.01) |

(52) U.S. Cl.
CPC ....... *H04B 10/07953* (2013.01); *H04B 10/50* (2013.01); *H04B 10/60* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 2006/0239463 A1 | 10/2006 | Young | |
| 2012/0328290 A1* | 12/2012 | Yuan | ..................... H04L 9/0855 398/154 |

(Continued)

FOREIGN PATENT DOCUMENTS

| | | |
|---|---|---|
| CN | 106254071 A | 12/2016 |
| CN | 113765661 A | 12/2021 |
| EP | 4 149 049 A1 | 3/2023 |

OTHER PUBLICATIONS

Woodward, "Simplifying Measurement-Device-Independent Quantum Key Distribution with Directly Modulated Laser Sources", 2021, Optical Fiber Communication Conference (pp. F2E-2). Optica Publishing Group. (Year: 2021).*

(Continued)

*Primary Examiner* — Darren E Wolf
(74) *Attorney, Agent, or Firm* — Oblon, McClelland, Maier & Neustadt, L.L.P.

(57) ABSTRACT

A quantum communication system comprising:
  an transmitter and a receiver, the transmitter comprising transmitter components the transmitter components comprising a source of pulsed radiation and a modulation unit, the modulation unit being configured to randomly encode pulses of radiation; and
  a receiver comprising receiver components, the receiver components comprising a demodulator and detector configured to decode and detect said randomly encoded pulses,
  the system further comprising a control unit and an optimisation unit, the control unit being configured to apply a plurality of control signals defined by a set of control parameters to at least one of said transmitter components and receiver components, the optimization unit being configured to tune the set of control parameters, (Continued)

wherein the optimisation unit sets the control parameters by:

obtaining a score indicating the quality of the system corresponding to a first set of control parameters; and estimating a further set of control parameters suitable via an iterative process to obtain a tuned set of control parameters.

20 Claims, 12 Drawing Sheets

(56) References Cited

U.S. PATENT DOCUMENTS

| | | | | |
|---|---|---|---|---|
| 2017/0357061 | A1* | 12/2017 | Shields | G02B 6/4203 |
| 2020/0160204 | A1* | 5/2020 | Johnson | G06N 10/00 |
| 2021/0175976 | A1* | 6/2021 | Rahman | H04B 10/70 |

OTHER PUBLICATIONS

Combined Search and Examination Report and Written Opinion issued Dec. 1, 2022, in GB 2203155.3 filed on Mar. 7, 2022, citing documents 1, 15-16 therein, 9 pages.

Woodward, R. I., et al. "Towards 'smart lasers': self-optimisation of an ultrafast pulse source using a genetic algorithm" Scientific Reports. Nov. 21, 2016, 9 pages.

Yuan, Z. L., et al. "Directly Phase-Modulated Light Source" Physical Review X 6, 031044, 2016, 8 pages.

Japanese Office Action issued Jan. 23, 2024 in Japanese Patent Application No. 2023-023718 (with English Translation), citing reference 24 therein, 7 pages.

Woodward et al., "Self-tuning quantum key distribution transmitter based on a genetic algorithm", 2022 Optical Fiber Communications Conference and Exhibition (OFC), Mar. 6, 2022, 3 pages.

United Kingdom Office Action issued Jun. 24, 2024 in United Kingdom Application 2203155.3, citing document 15 therein, 5 pages.

Japanese Office Action issued Jun. 11, 2024 in Japanese Application 2023-023718, (with unedited computer-generated English translation), citing documents 24-27 therein, 9 pages.

Lo, Y.S. et al., "Self-tuning quantum key distribution transmitter based on a genetic algorithm", IEEE, Optica Publishing Group, 2022, 3 pages.

"Conference table of contents", Optical Fiber Communications Conference and Exhibition (OFC), IEEE, 2022, 7 pages.

"General Information", Optical Fiber Communications Conference and Exhibition (OFC), IEEE, 2022, 4 pages.

"Conference detail", Optical Fiber Communications Conference and Exhibition (OFC), Optica Publishing Group, 2022, 7 pages.

* cited by examiner

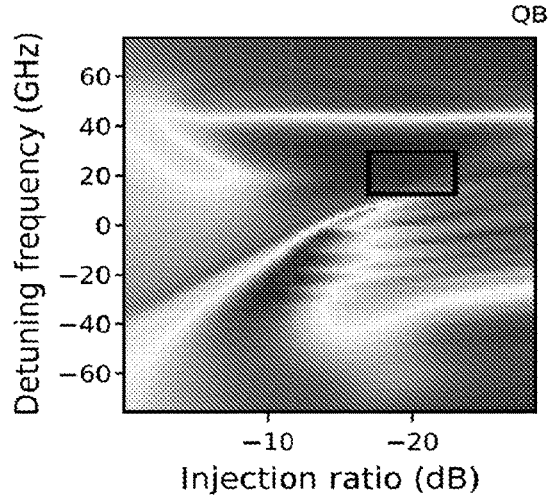
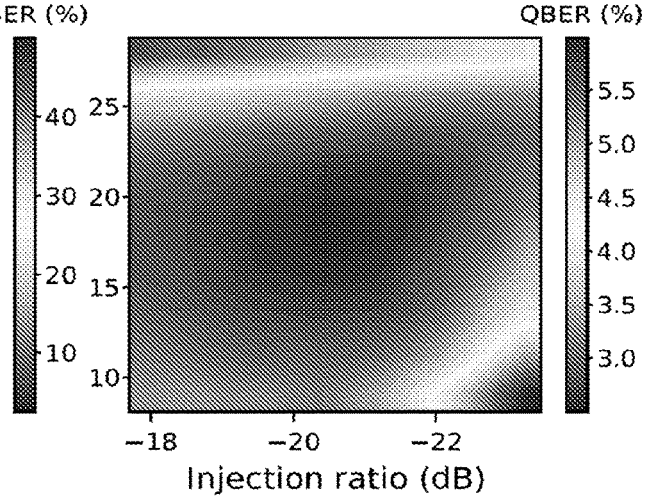
FIG. 12A  FIG. 12B
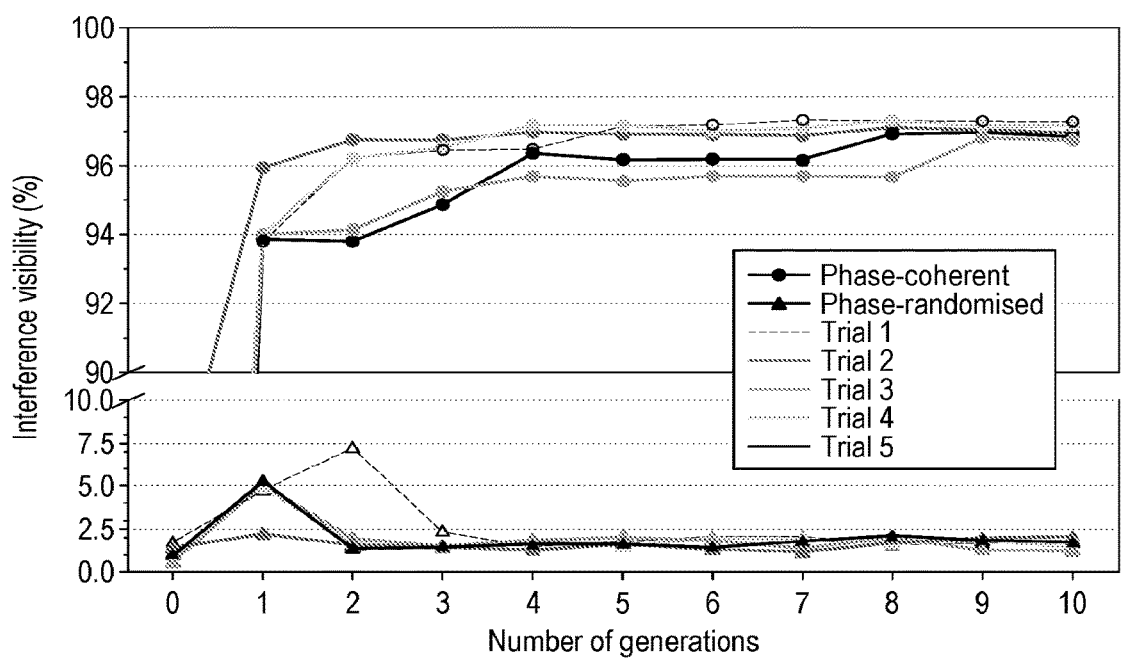
FIG. 13 ical CROSS REFERENCE

This application claims priority from GB patent application number 2203155.3, the contents of which are herein incorporated by reference.

FIELD

Embodiments described herein relate to a quantum communication system, a transmitter for a quantum communication system, a receiver for a quantum communication system and a method of controlling a quantum communication system.

BACKGROUND

In a quantum communication system, information is sent between a transmitter and a receiver by encoded single quanta, such as single photons. Each photon carries one bit of information which can be encoded upon a property of the photon, such as its polarization.

Quantum key distribution (QKD) is a technique which results in the sharing of cryptographic keys between two parties: a transmitter often referred to as "Alice"; and a receiver often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string Alice and Bob can thus determine if Eve has gained information.

BRIEF DESCRIPTION OF THE FIGURES

FIG. 12A is a map of experimentally measured QBER of BB84 QKD protocol as a function of laser detuning frequency and injection ratio, the box indicates the promising region for optimum operation, FIG. 12B is a zoomed-in plot of the enclosed region.

FIG. 13 is a plot showing the evolution of optimisation on phase coherence for phase-coherent and phase-randomised pulses. The population size for the first three generations is 35, then reduced to 25 for subsequent generations. The time taken to complete 10 generations is 4 hours (50s per evaluation of individual).

DETAILED DESCRIPTION OF THE FIGURES

Figure 1:
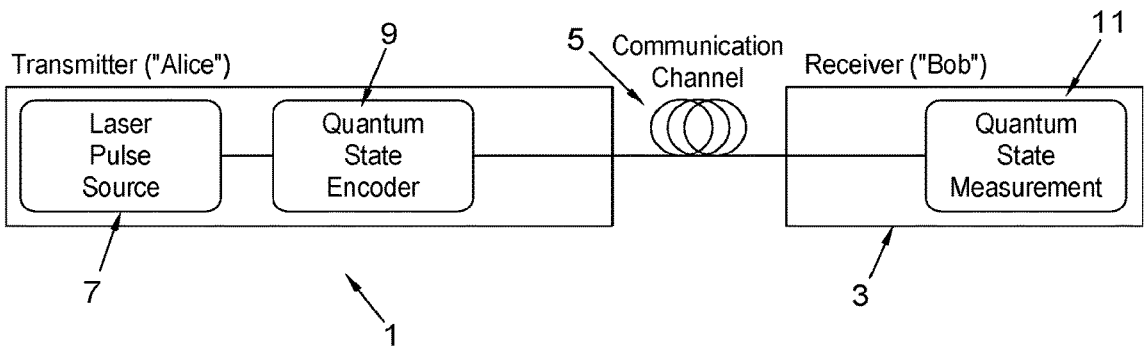
FIG. 1 is a schematic of a point to point QKD system.

In an embodiment, a quantum communication system is provided, comprising:
an transmitter and a receiver, the transmitter comprising transmitter components the transmitter components comprising a source of pulsed radiation and a modulation unit, the modulation unit being configured to randomly encode pulses of radiation; and
a receiver comprising receiver components, the receiver components comprising a demodulator and detector configured to decode and detect said randomly encoded pulses,
the system further comprising a control unit and an optimisation unit, the control unit being configured to apply a plurality of control signals defined by a set of control parameters to at least one of said transmitter components and receiver components, the optimization unit being configured to tune the set of control parameters,
wherein the optimisation unit sets the control parameters by:
obtaining a score indicating the quality of the system corresponding to a first set of control parameters; and
estimating a further set of control parameters suitable via an iterative process to obtain a tuned set of control parameters.

The above system allows self-tuning of the hardware of the complex QKD system. Previously, the determination of optimal control parameters and driving signals for all QKD hardware was performed manually. Much of this was done during the system design phase, based on known hardware specifications, but other components must be adjusted during system operation in response to changes in environment. The situation is further complicated due to inherent variations between components—i.e. even if one QKD system is perfectly optimized manually, the optimal parameters for a system with similar components may be slightly different. This means that the current manufacturing process for QKD systems includes various manual tasks to fine-tune the settings for each device. Such optimization is a time-consuming task requiring a trained user with expert knowledge of optics, electronics and the QKD system design. This requirement is practically costly and impacts upon manufacturing scalability.

Furthermore, ongoing research is leading to the development of new, improved QKD system designs with better performance/fewer components. These benefits, however, are often achieved by precisely exploiting laser dynamics and electrically-controlled light-matter interactions—as a result, such "improved" designs (such as phase seeding) can actually complicate the manufacturing stage of QKD technology by introducing more manual optimization tasks.

The task of optimization is very complicated since the underlying problem involves many coupled variables and nonlinear behaviour (e.g. laser dynamics are fundamentally nonlinear). Therefore, one cannot simply find optimal performance by scanning all of parameter space, or applying simple feedback loops for each variable in turn (i.e. the problem is not convex). Optimization of a complete system requires a holistic approach that considers many variables simultaneously while also measuring multiple output properties that affect the overall QKD performance.

In an embodiment, the optimisation unit is configured to obtain the score from at least one measurement indicating the quality of the system. This is a physical measurement of the QKD system. The physical measurement may be derived from a measurement normally performed in a QKD system, e.g. QBER or may be derived from additional hardware or sensors provided to take further measurements, for example of the phase. In an embodiment, the measurements indicating the quality of the system may be selected from the quantum bit error rate "QBER", the Secure bit rate "SBR", phase information of the encoded pulses, count rates for all pulses received at the detectors of the receiver, the count rates for pulses with a predetermined encoding, the shape of the received pulses or the arrival time of the pulses at the detector.

In an embodiment, the optimisation unit is configured to calculate the score from the quality measurements using an objective function.

In a further embodiment, the control signals are electronic control signals for the source of pulsed radiation comprising at least one of: the intensity of the electronic control signal; the shape of the electronic control signal; and the DC offset of the electronic control signal. The source of pulsed radiation may provided on a temperature controlling element and wherein the control unit further provides a control signal to said temperature controlling element.

The source of pulsed radiation may comprises a primary laser and a secondary laser, where the primary laser provides a seeding pulse to the secondary laser. In such a situation, set of control parameters may comprises control parameters for one of or both of the primary laser and the secondary laser.

In an embodiment, the control signals are electronic control signals for the modulator comprising at least one of: the intensity of the electronic control signal; the shape of the electronic control signal; and the DC offset of the electronic control signal. In an embodiment, the modulator is a phase modulation unit comprising an interferometer. The transmitter may also have one or more intensity modulators in addition to the modulator which is used to encode the light pulses. The control signals for the intensity modulators may also be optimised via the optimisation unit. For both intensity modulators and phase modulators, the control signals may comprise one or more of: the intensity of the electronic control signal; the shape of the electronic control signal; and the DC offset of the electronic control signal.

In an embodiment, the control signals are electronic control signals for the demodulator comprising at least one of: the intensity of the electronic control signal; the shape of the electronic control signal; and the DC offset of the electronic control signal. The demodulator may comprise an interferometer with a phase modulator provided in at least one arm of the demodulator.

In an embodiment, the control signals are electronic control signals for the detector comprising at least one of: the intensity of the electronic control signal; the shape of the electronic control signal; and the DC offset of the electronic control signal.

In a further embodiment, the optimisation unit is configured to obtain the tuned parameters using an evolutionary algorithm. For example, the evolutionary algorithm may be a genetic algorithm. In a further embodiment, the optimisation unit is configured to obtain the tuned parameters using a reinforcement learning. For reinforcement learning, the score acts as a the reward for a reinforcement learning algorithm. The optimisation unit may be embodied in software or hardware. The optimisation unit may be standard computer or implemented using hardware acceleration, for example using an FPGA or custom electronics.

The optimisation unit may be provided in one or both of the transmitter and receiver. It is also possible for the transmitter and/or receiver to have their own optimisation unit Thus, in a further embodiment, a transmitter for a quantum communication system is provided, the transmitter comprising transmitter components the transmitter components comprising a source of pulsed radiation and a modulation unit, the modulation unit being configured to randomly encode pulses of radiation;

the transmitter further comprising a control unit and an optimisation unit, the control unit being configured to apply a plurality of control signals defined by a set of control parameters to at least one of said transmitter components, the optimization unit being configured to tune the set of control parameters, wherein the optimisation unit sets the control parameters by:

obtaining a score indicating the quality of the system corresponding to a first set of control parameters; and estimating a further set of control parameters suitable via an iterative process to obtain a tuned set of control parameters.

In a further embodiment, a receiver for a quantum communication system is provided, the receiver comprising receiver components, the receiver components comprising a demodulator and detector configured to decode and detect said randomly encoded pulses, the system further comprising a control unit and an optimisation unit, the control unit being configured to apply a plurality of control signals defined by a set of control parameters to at least one of said receiver components, the optimization unit being configured to tune the set of control parameters, wherein the optimisation unit sets the control parameters by:
obtaining a score indicating the quality of the system corresponding to a first set of control parameters; and
estimating a further set of control parameters suitable via an iterative process to obtain a tuned set of control parameters.

In a further embodiment, a method of controlling a quantum communication system is provided, the quantum communication system comprising:
an transmitter and a receiver, the transmitter comprising transmitter components the transmitter components comprising a source of pulsed radiation and a modulation unit, the modulation unit being configured to randomly encode pulses of radiation; and
a receiver comprising receiver components, the receiver components comprising a demodulator and detector configured to decode and detect said randomly encoded pulses,
the method comprising:
applying a plurality of control signals defined by a set of control parameters to at least one of said transmitter components and receiver components;
obtaining a score from at least one measurement indicating the quality of the system corresponding to a first set of control parameters; and
estimating a further set of control parameters suitable via an iterative process to obtain a tuned set of control parameters.

FIG. 1 shows a quantum key distribution (QKD) system. The simplified configuration of FIG. 1 comprises a transmitter 1 and receiver 3, connected by an optical communication channel 5 (e.g. optical fibre, or free-space).

The transmitter 1 (often referred to as "Alice") comprises a source of pulsed radiation 7 and a state encoder 9. The transmitter 1 generates quantum states, which, in an embodiment, are coherent states formed by the pulsed laser emission of the source of pulsed radiation 7 and state encoder 9 (which modules the light with both a bit value (0 or 1) and in a random basis (e.g. X or Y basis)). While various different encoding schemes exist (e.g. polarization encoding, time-bin encoding etc), all QKD protocols rely on high-speed high-quality state generation (i.e. negligible error between expected encoding value and actual encoded value).

The encoded light is transmitted along the communication channel 5, where it may experience optical phenomena that change some of the pulse properties—for example, dispersion may broaden the pulse, polarization fluctuations may alter the polarization state, channel timing delays may change the expected pulse arrival time etc.

At the receiver 3 ("Bob"), the quantum state is measured, which involves randomly choosing a basis for measurement (e.g. by applying some unitary operation on the quantum state) using a demodulator (not shown) and then detecting the signal using single-photon detectors (not shown) to form a quantum state measurement 11. Although various detection approaches exist, they usually rely on the ability to accurately determine the encoded bit value while rejecting noise sources such as detector noise or other noise introduced by the channel.

Following the generation, transmission and measurement of quantum states, a post-processing stage is performed involving authenticated classical communication between Alice and Bob, where they reveal a subset of their random choices to perform sifting, information reconciliation, error correction and privacy amplification. This results in an information theoretically secure quantum key distributed on both the remote nodes, which can then be delivered to other equipment for e.g. data encryption.

A basic quantum communication protocol which uses polarisation will now be explained. However, it should be noted that this is not meant as limiting and other protocols could also be used. For simplicity, this protocol refers to polarisation, but phased based protocols could also be used.

The protocol uses two basis wherein each basis is described by two orthogonal states. For this example the basis of H/V and D/A. However, the L/R basis could also be selected.

The sender in the protocol prepares states with one of H, V, D or A polarisation. In other words, the prepared states are selected from two orthogonal states (H and V or D and A) in one of two basis H/V and D/A. This can be thought of as sending a signal of 0 and 1 in one of two basis, for example H=0, V=1 in the H/V basis and D=0, A=1 in the D/A basis. The pulses are attenuated so that they comprise on average, one photon or less. Thus, if a measurement is made on the pulse, the pulse is destroyed. Also, it is not possible to split the pulse.

The receiver uses a measurement basis for the polarisation of a pulse selected from the H/V basis or the D/A basis. The selection of the measurement basis can be active or passive. In passive selection the basis is selected using fixed components, such as a beam splitter. In "active" basis choice, the receiver makes a decision which basis to measure in—e.g. using a modulator with an electrical control signal. If the basis used to measure the pulse at the receiver is the same as the basis used to encode the pulse, then the receiver's measurement of the pulse is accurate. However, if the receiver selects the other basis to measure the pulse, then there will be a 50% error in the result measured by the receiver.

To establish a key, the sender and receiver compare the basis that were used to encoder and measure (decode). If they match, the results are kept, if they do not match the results are discarded. The above method is very secure. If an eavesdropped intercepts the pulses and measures then, the eavesdropper must prepare another pulse to send to the receiver. However, the eavesdropper will not know the correct measurement basis and will therefore only has a 50% chance of correct measuring a pulse. Any pulse recreated by the eavesdropper will cause a larger error rate to the receiver which can be used to evidence the presence of an eavesdropper. The sender and receiver compare a small part of the key to determine the error rate (QBER) and hence the presence of an eavesdropper.

The above description of a QKD system only describes the basic operation, however. In practice, as well as the core quantum state generation/encoding/measurement devices, there are also components included for compensating channel disturbances or non-idealities in real-world components (e.g. polarization adjustment, power adjustment, dispersion compensation, timing compensation etc). Precise electronic control is also required of all the optoelectronic hardware to ensure Alice and Bob (and all their internal hardware) are well synchronized.

Figure 2:
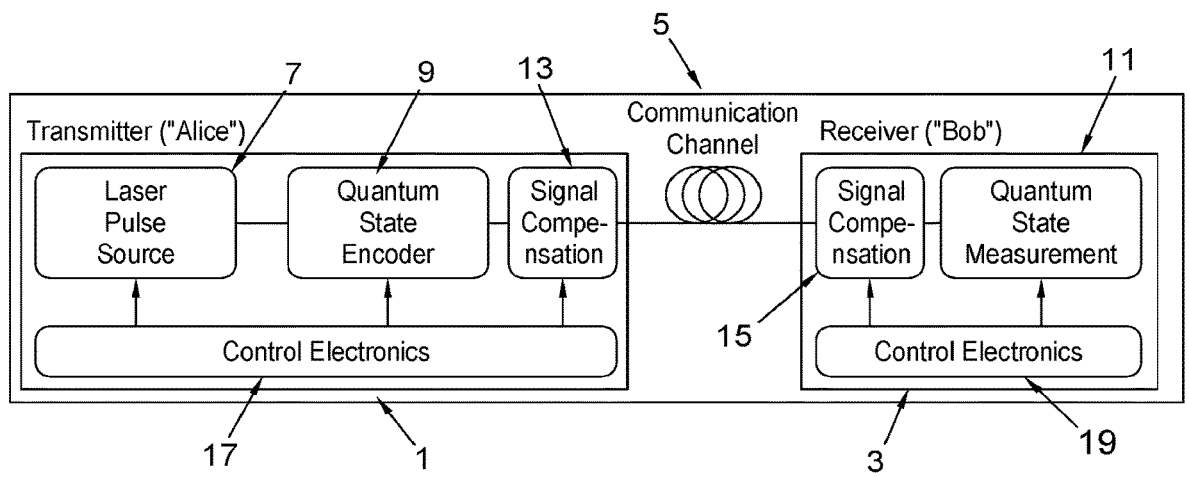
FIG. 2 is a schematic of a point to point QKD system with control electronics.

FIG. 2 illustrates a QKD system showing more explicitly these additional components/stages that are important to ensure high-performance operation in the presence of real-world disturbances. Note that exact implementations can vary, with compensation performed at either Alice and/or Bob and with compensation performed in any order. To avoid unnecessary repetition, where appropriate the same reference numerals have been used as for FIG. 1. In addition, in FIG. 2 in the transmitter, control electronics 17 and signal compensation unit 13 are provided. In the receiver, control electronics 19 and signal compensation unit 15 are provided.

Figure 3:
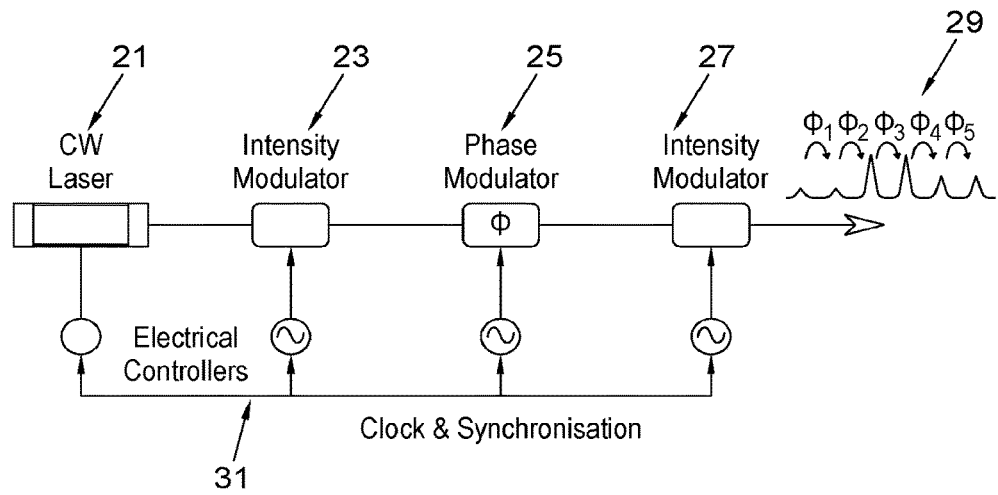
FIG. 3 is a schematic of a QKD emitter with a CW laser.

A range of optical/electronic system designs are possible for performing QKD. FIG. 3 shows an example of such an approach. Here, the transmitter comprises a continuous wave (CW) laser 21, followed by modulators 23, 25 and 27 to carve out pulses in time and to encode the phase between pulses. The first intensity modulator 23 is used to carve the CW outputs into pulses. The phase modulator 25 is then used to encode the pulses. In an embodiment, a phase modulator comprises an asymmetric mach-Zehnder interferometer (AMZI) with a phase modulation component provided in of the arms of the AMZI. The second intensity modulator 27 is then provided to attenuate the pulses output by the phase modulator 25 into pulses that have, on average, one photon or less. In further embodiments, the second intensity modulator is also used to implement decoy states, which are required for many QKD protocols. Decoy states are just like the other encoded states, but have a reduced amplitude (i.e. lower average photon number used for decoy pulses). This enables them to be used for avoiding attacks such as the photon number splitting attack.

To achieve short (for example, picosecond-scale) clearly defined pulses intensity modulators 23 and 27 are used which have a high dynamic range. In terms of phase, in an embodiment, QKD requires that each quantum state is phase randomized. If phase encoding is used, whereby a quantum state is encoded by the phase between two time-bins, then the phase between the two bins is precisely controlled.

This places exacting requirements on all the modulators 23, 25 and 27 as well the emission of highly coherent stable light from the laser 21. The quality of the output can be improved by precise control of the electronic driving signals applied to the modulators 23, 25, 27 and laser 21. For example, the quality of the output can be improved by tuning the biasing/control of the laser 21 and the control of the modulators. The modulators have the additional complexity of being driven by RF signals with appropriate amplitude and timing to generate a train of properly encoded quantum states. The lasers are also driven by RF signals for some embodiments of QKD transmitters. For "phase seeding" arrangements (i.e. gain-switched primary-secondary laser arrangements), both the primary and secondary laser have an applied RF signal which generates the optical pulses. Further electrical control signals with many customizable parameters may also need to be tuned such as the control signals for other signal compensation devices such as polarization controllers, attenuators etc (not shown in figure).

Figure 4A:
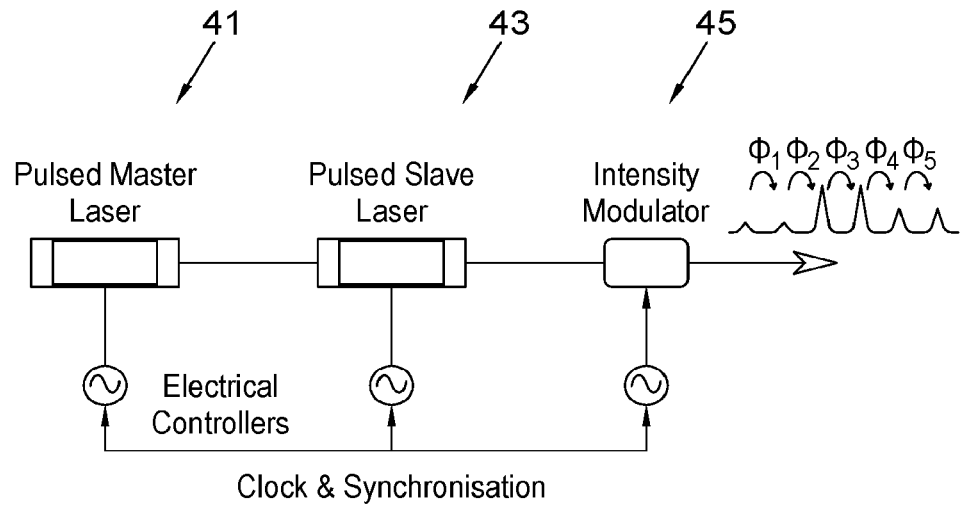
FIG. 4A is a schematic of a QKD emitter with a primary and secondary laser seeding arrangement and FIG. 4B is a schematic of the corresponding driving signals and optical output.
Figure 4B:
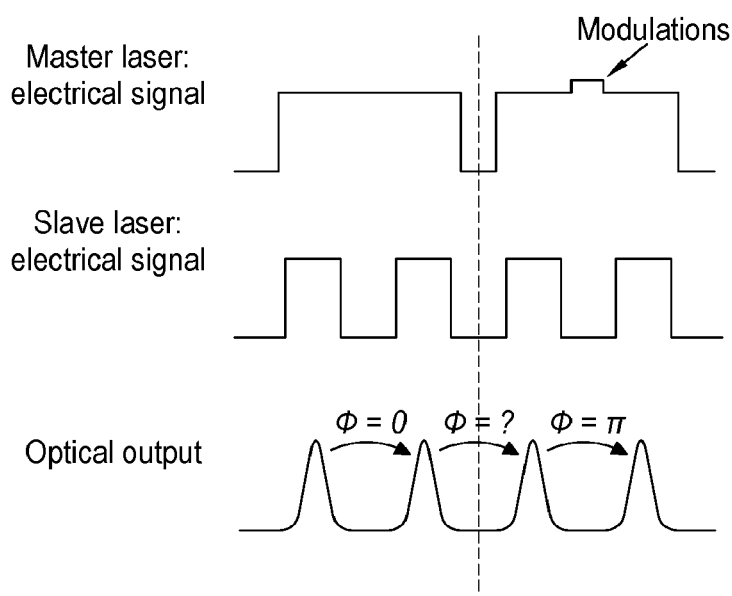

FIG. 4A shows an alternative transmitter design which uses 'phase seeding'. In a phase seeding QKD transmitter, multiple modulators are replaced by a primary-secondary arrangement (whereby the primary laser injection locks the secondary, and the primary's current is modulated to impose phase modulation upon the secondary). This has the benefit of removing modulators, which are typically bulky, costly and prevent the chip-scale integration of designs onto photonic chips (since lithium niobate-based modulators are not compatible with photonic integration). FIG. 4B shows a driving scheme for such an arrangement with primary and secondary lasers.

In the above embodiment of FIGS. 4A and 4B, the arrangement is shown where one primary pulse seeds 2 secondary pulses. FIGS. 5A to 5F described some of the physics behind laser seeding. Here, for simplicity the situation is described where one primary pulse seeds one secondary pulse.

FIGS. 5A to 5F are used to explain a specific type of source which allows the formation of an ultra-compact and high-performance QKD transmitters. This source, shown in FIG. 5A has directly phase modulated pulses using gain-switching and optical injection locking and does not need external phase modulators.

The source comprises a pulsed secondary laser 103 into which a pulse from a primary laser 103 is injected to define the phase between the secondary laser's output pulses, based on optical injection locking. The primary laser 101 performs the task of phase preparation whereas the secondary laser 103 performs the task of pulse generation. The description of FIGS. 5A to 5D focusses more on the control of the primary laser. The description of FIGS. 5E and 5F focusses more on the secondary laser and the combination of the two lasers.

Figure 5A:
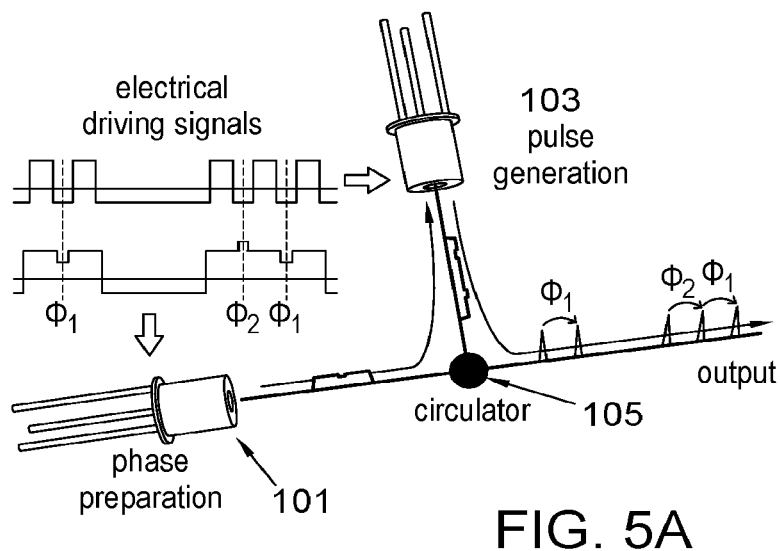
FIG. 5A is a schematic of a primary and secondary laser arrangement.

As schematically depicted in FIG. 5A, a primary laser diode 101 is connected to a secondary laser diode 103 via an optical circulator 105. It should be noted that the circulator is not essential. Further embodiments use different methods for injecting light from one laser into another depending on the laser type/packaging. For example, FIG. 4A shows direct injection into one side of the laser with emission output taken from the other. Such an arrangement is possible when, for example, the laser has partially reflective facets on both sides of the cavity) It should be noted that the primary 101 and secondary 103 laser diodes may be identical, the terms "primary" and "secondary" are used merely for clarity and do not imply any physical differences between the primary 101 and secondary 103 laser diodes.

The primary laser 101 is used for phase-preparation is directly modulated to produce long pulses from quasi-steady-state emission. Each of these pulses coherently seeds a block of two or more secondary, short optical pulses emitted by gain switching the secondary or pulse-generation laser 103. The phase-preparation laser 101 is biased to produce nanosecond scale or even less, quasi-steady-state optical pulses with shallow intensity modulation, which also modifies the optical phase. For clock rates greater than 1 GHz, the pulse width is less than 1 ns. The gain-switched pulse-generation laser 103 emits short optical pulses which inherit the optical phase prepared by the phase-preparation laser. The duration of each phase-preparation laser pulse can be varied to seed a pulse train of different lengths.

The relative phase between the secondary pulses depends on the phase evolution of the primary pulses and can be set to an arbitrary value by directly modulating the driving current applied to the primary or phase-preparation laser 101.

For example, a relative phase $\Phi_1$ between two secondary pulses can be obtained by introducing a small perturbation in the driving signal of the phase-preparation laser FIG. 5A. Similarly, the relative phases between three secondary pulses can be set to $\Phi_1$ and $\Phi_2$ by adding two small perturbations to the driving signal of the primary laser 101.

In principle, such perturbations in the driving signal would cause detrimental fluctuations in the intensity and frequency of the primary pulses. However, these can be avoided by switching the secondary laser's 103 gain off in correspondence with the perturbation signals. Effectively, the secondary laser 103 also acts as a filter rejecting residual modulations.

To understand how an optical phase is set by perturbing the driving signal applied to the phase-preparation laser, it is useful to consider a continuous wave laser above threshold emitting at the central frequency $\upsilon_0$.

Figure 5B:
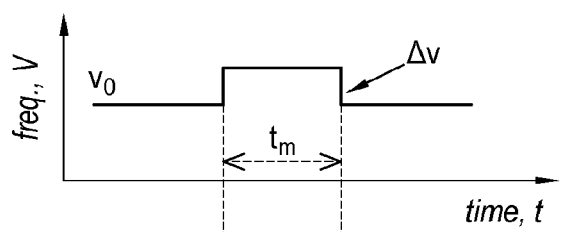
FIG. 5B is a plot of the optical frequency of the primary laser under a small perturbation of the control gain of duration $t_m$.

FIG. 5B is a plot of the optical frequency of the phase-preparation laser under a small perturbation of duration $t_m$.

Figure 5C:
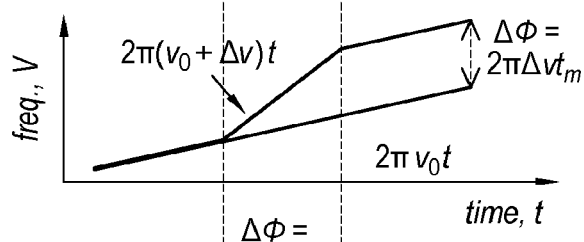
FIG. 5C is a plot of optical phase trajectories with and without the perturbation of the primary laser.

FIG. 5C is a plot of optical phase trajectories with and without the perturbation of the phase-preparation laser.

Figure 5D:
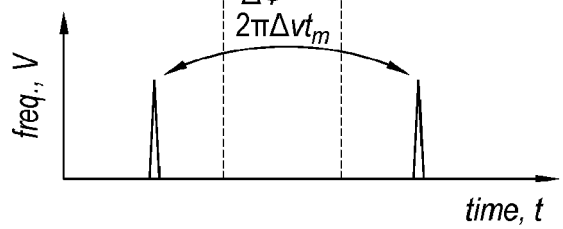
FIG. 5D is a plot of the output pulses of the secondary laser.

When a small perturbation is applied to the driving signal, the optical frequency shifts by an amount $\Delta\upsilon$, changing the course of the phase evolution. When the perturbation is switched off, the frequency is restored to the initial value $\upsilon_0$. This perturbation will create a phase difference:

$$\Delta\Phi=2\pi\Delta\upsilon t_m$$

where $t_m$ is the duration of the perturbation. Through optical injection, this phase difference is transferred onto a pair of secondary pulses emitted by the pulse-generation laser as shown in FIG. 5D.

The perturbation signal here is an electrical voltage modulation applied to the phase-preparation laser. The optical frequency change arises from the effect of the carrier density on the refractive index in the laser active medium within the primary laser diode 101. The laser cavity confinement allows the light field to oscillate back and forth within the cavity and experience the refractive-index change for the entire duration of the perturbation. The enhancement due to the laser cavity makes it possible to keep the phase modulation half-wave voltage below 1 V. This cavity feature is absent in conventional phase modulators, where the light makes just a single pass across the electro-optic medium, thus limiting the interaction distance to the device length.

Small changes to the primary light source's electric controller signal (of less than 1 volt—much less than required by a conventional lithium niobite phase modulator) can yield transient changes to the output frequency of the primary light source's output, which then change the output phase of the secondary laser's optical output.

In this embodiment, the primary laser 101 is configured output a sequence of light pulses comprises a sequence of pairs. The phase of the pulses output by the primary laser is controlled so that the phase between pulses in the same pair is randomly selected from one of a set of phase differences and there is a random phase difference between pulses from different pairs. In an embodiment, the set of phase differences may be selected from one of 0, $\pi/2$, $-\pi/2$ and $\pi$.

The secondary laser 103 that is seeded by the primary laser will output a sequence of pairs of pulses having the same phase differences as the sequence of pulses output by the primary laser 101.

Pulsed injection seeding occurs each time the secondary laser 103 is switched above the lasing threshold. In this case, the generated secondary light pulse has a fixed phase relation to the injected primary light pulse. As only one secondary light pulse is generated for each injected primary light pulse, the phase relationship between the pulses output by the secondary laser is the same as the relationship between the pulses injected into the secondary laser.

Under the operating conditions that will be described below in relation to FIGS. 5E and 5F, the secondary laser 103 generates a new sequence of pulses, which comprise a sequence of pairs. The phase between pulses in the same pair is randomly selected from one of a set of phase differences and there is a random phase difference between pulses from different pairs. These pulses will also have a smaller time jitter $\tau'<\tau$ to the pulses outputted by the primary laser 101. The reduced jitter time this improves interference visibility due to the low time jitter of the secondary light pulses.

In order for pulsed injection seeding to occur, the frequency of the light pulses from the primary laser 101 must match the frequency of the secondary laser 103 to within a certain range. In one embodiment, the difference in the frequency of the light supplied by the primary laser 101 and the frequency of the secondary laser 103 is less than 30 GHz. In some embodiments, where the secondary laser 103 is a distributed feedback (DFB) laser diode the frequency difference is less than 100 GHz.

For successful pulsed injection seeding the relative power of the primary laser 101 output light pulses that enter the optical cavity of the secondary laser 103 has to be within certain limits which depend on the type of light source that is used. In one embodiment, the optical power of the injected light pulses is at least 1000 times lower than the optical output power of the secondary laser 103. In one embodiment, the optical power of the injected light pulses is at least 100 times lower than the optical output power of the secondary laser 103.

In one embodiment, secondary laser 103 and primary laser 101 are electrically driven, gain-switched semiconductor laser diodes. In one embodiment, the secondary light source and primary light source have the same bandwidth. In one embodiment, both light sources have a bandwidth of 10 GHz. In one embodiment, both light sources have a bandwidth of 2.5 GHz. Here, the bandwidth means the highest bit rate achievable with the gain-switched laser diode under direct modulation. A laser of a certain bandwidth can be operated at a lower clock rate.

Figure 5E:
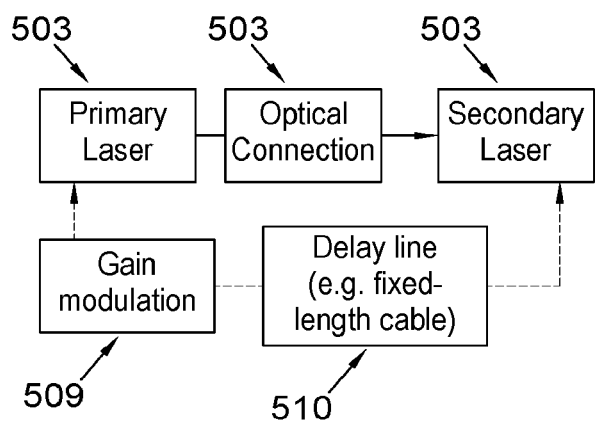
FIG. 5E is a schematic of a gain modulation circuit for driving a primary laser and a secondary laser and FIG. 5F is a series of five time dependent plots which are, in order from the upper most plot: modulation of primary laser; carrier density of primary laser; output of primary laser; modulation of secondary laser; and output of secondary laser.

FIG. 5E is a schematic illustration of a driving scheme for the phase-randomised light source 500 for which both the primary laser 503 and the secondary laser 502 are driven with a single gain modulation unit 509. The gain modulation unit 509 and delay line 510 are an example of a controller which is configured to apply a time varying drive signal to the secondary laser 502 such that just one light pulse is generated during each period of time for which a light pulse is received. The primary laser 503 is connected to the secondary laser 502 via an optical connection 505. The optical connection 505 could be a waveguide, for example an optical fibre. Alternatively, the light pulses may travel between the primary laser 503 and the secondary laser 502 through free space. The optical connection may include further components such as an optical circulator or a beam splitter as provided in the arrangement of FIG. 5A.

A gain modulation unit 509 drives both the primary laser 503 and the secondary laser 502 to generate pulses of light. The delay line 510 is used to synchronise the apparatus. The delay line may be, for example, a fixed length cable. The gain modulation unit is directly connected to the primary laser 503. For example, where the primary laser 503 is a semiconductor laser, a gain modulation circuit is electrically connected to the primary laser 503. The gain modulation unit 509 is connected to the secondary laser 502 through delay line 510.

Figure 5F:
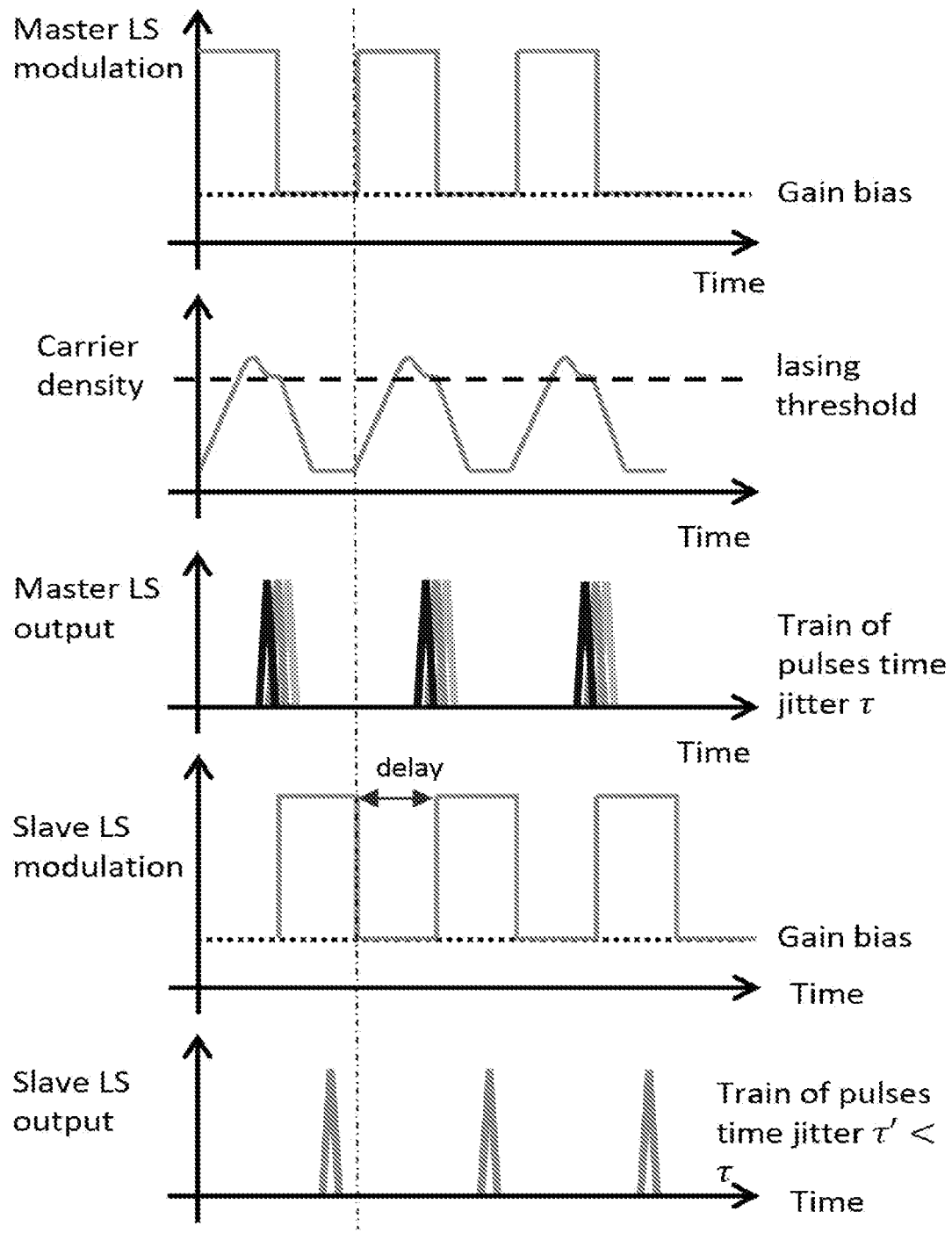

FIG. 5F shows a temporal sequence for the single gain modulation scheme shown in FIG. 5E. The upper graph shows the gain modulation applied to the primary light source 503. The current applied to the laser is shown on the vertical axis, with time on the horizontal axis. The gain modulation is a time varying drive signal, having the form of a square wave, which when applied to the primary light source, varies the carrier density above and below the lasing threshold. In other words, the gain modulation is a series of pulses. In between the pulses, the gain has a minimum value, which is the gain bias and is indicated by the dotted line. The wave in this case is a square-type waveform. A different gain modulation signal can be used, for example a sine wave, or a non-periodic time varying signal. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

The next graph shows the output of the primary laser 503. One light pulse is outputted each time the carrier density increases above the lasing threshold. As explained above, there can be a delay between when the gain increases and when a light pulse is outputted. The light pulses output from the primary laser have a large time jitter τ.

The next graph shows the gain modulation applied to the secondary laser 502. The gain modulation is the same as that applied to the primary laser 503, with the addition of the time delay labelled by an arrow. The gain modulation is a time varying drive signal applied to the secondary laser. In other words, the gain modulation applied to the secondary laser. 502 is shifted in time with respect to the gain modulation applied to the primary laser 503. Each periodic increase in gain is applied to the secondary laser 502 later than it is applied to the primary laser 503. The delay in this case is around half a period of the gain modulation signal. The delay means that the periodic increase in gain is applied to the secondary laser 502 after the light pulse has been injected. Therefore the light pulse from the primary laser 503 is present in the laser cavity of the secondary laser when the gain increase is applied, and the resulting secondary laser 502 generating a light pulse by stimulated emission from the primary light pulse. This means that the generated light pulses from the secondary laser have a fixed phase relation to the light pulses injected into the secondary laser from the primary laser.

The secondary laser 502 is switched above the lasing threshold after a light pulse from the primary laser has been injected such that a pulse from the secondary laser is initiated by stimulated emission caused by the injected light pulse. The timing of the onset of the gain bias of the secondary laser 502 is controlled via the delay line 510. The final graph shows the output of the secondary laser 502. Only one light pulse is outputted each time the carrier density increases above the lasing threshold. Again, there can be a delay between the increase in gain modulation and the outputted light pulse. The time jitter of the outputted light pulses from the secondary laser is lower than that of the jitter of the light pulses from the primary laser.

In the system shown in FIG. 5E, the gain modulation unit 509 applies a time varying gain modulation to the secondary light source 502 such that it is switched above the lasing threshold only once during the time that each light pulse from the primary laser is incident. The switching of the secondary laser 502 is synchronised with the arrival of the light pulses from the primary laser.

In the system shown in FIG. 5F the time varying gain modulation signal has a square type wave form. However, the time varying gain modulation can comprise signals with arbitrary pulse shape.

Where the light sources are gain-switched semiconductor lasers, the gain modulation signal is an applied current or voltage. In one embodiment, the gain modulation signal is an applied current or voltage with a square type wave form. In an alternative embodiment, the time varying current or voltage is an electrical sine wave generated by a frequency synthesizer. In one embodiment, the frequency of the gain modulation signal is less than or equal to 4 GHz. In one embodiment, the frequency is 2.5 GHz. In one embodiment, the frequency is 2 GHz.

A gain-switched semiconductor laser has a good extinction ratio between the state when pulses are emitted and the "off" state. It can be used to generate very short pulses. In one embodiment, the duration of each of the pulses output from the secondary laser is less than 200 ps. In one embodiment, the duration of each of the pulses output from the secondary laser is less than 50 ps. In one embodiment, the duration of each of the pulses output from the secondary laser is of the order of a few picoseconds. In one embodiment, where the time varying current or voltage is a square wave current or voltage with a frequency of 2 GHz, the short light pulses are 500 ps apart.

In the light source shown in these figures, the primary laser and the secondary laser share the same electrical driver for gain modulation. However, the primary laser and the secondary laser could also be driven by separate gain modulation units 509. By driving the gain modulation by separate units, it is possible to generate longer light pulses output from the primary laser than those shown in FIG. 5F as the gain bias value is closer to the lasing threshold. This means that the carrier density crosses the lasing threshold earlier, which gives the light pulse more time to evolve. This can also be used to reduce jitter.

For the self-tuning of control parameters described herein, in an embodiment, there is autonomous setting of the control signals that drive both lasers (i.e. each laser is set with a different optimum DC bias, AC waveform amplitude, waveform shape and signal timing; on top of this each laser needs the wavelength setting precisely (e.g. by controlling a temperature controller attached to each laser) for achieving good injection locking.

Other QKD transmitter designs are possible and the below described method can be applied to many other QKD system embodiments.

The above has just referred to the transmitter. However, complex multi-component optoelectronic designs are required for QKD receivers which also perform better if the control parameters for these receivers are tuned.

Figure 6:
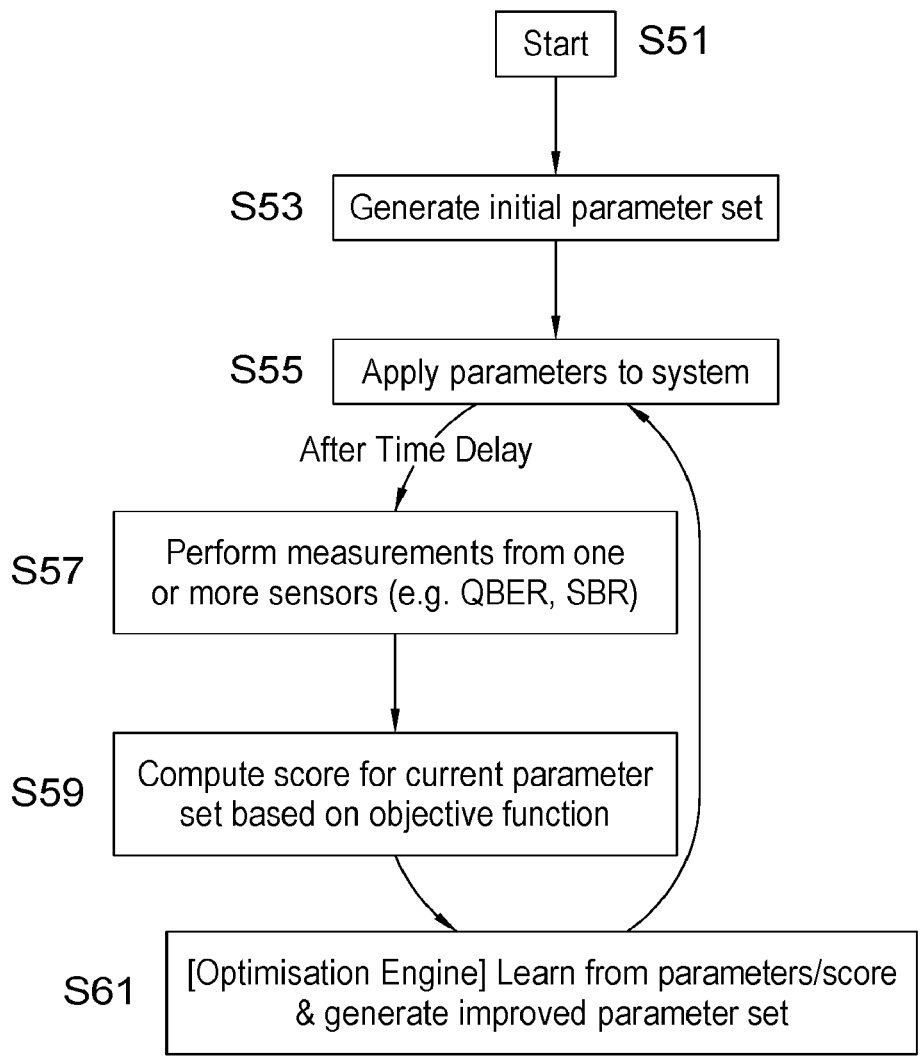
FIG. 6 is a flow chart of a method in accordance with an embodiment.

FIG. 6 is a flow chart showing a method for the automatic tuning of the control parameters which define the control signals. This allows the autonomous tuning of the electrical control signals.

FIG. 6 shows a method which employs a self-tuning optimization system which employs one or more objective functions (a.k.a. fitness functions) to assess overall QKD system performance and then uses this scoring metric to intelligently adjust parameters to obtain optimal QKD performance.

After the start of the method in S51, the QKD system generates initial parameters in step S53. These may be "typical" parameters based on prior knowledge of the system or could be completely random values. The parameters are applied to the system in step S55 (i.e. digital/electrical driving signals are applied to the components of the system to implement these settings) and one or more measurements are performed to determine the quality of the system operating with these parameters in step S57.

The measurements S57 may be made after a short delay to allow time for any transient phenomena to subside. In an embodiment, these measurements are performed using dedicated hardware/sensors that are added to the QKD systems (e.g. to directly measure power/polarization/temporal behaviour etc). However, in a further embodiment of the measurements could be extracted from the normal QKD operation (e.g. extracting the quantum bit error rate, QBER, or taking the output secure bit rate SBR which is computed after the sifting, information reconciliation, error correction and privacy amplification steps). It is possible to combine the measurements collected from normal QKD operation and those from added dedicated hardware such as sensors etc.

In step S59, an objective function is then executed that computes a 'performance score' based on these measurements. This score gives an indication of how good/bad the parameters are and is intended as a mean of comparing parameter sets. The objective function may simply be a single measurement—e.g. the secure bit rate, or the score could be computed based on a carefully chosen mathematical formula. This function may reward good behaviour in some measurements as well as penalizing undesirable outputs in other measurements. In an embodiment, a single measurement is collected in S57, for example the QBER and SER and the objective function just outputs this value or outputs the value with a scaling, e.g. normalizing. However, when two or more measurements are made in step S57, the objective function combines these measurements to output a single score. Examples of possible objective functions are normalisation, summations, summation of reciprocal values, cost functions etc, Where the objective value combines measurements, the measurements may be weigthed. The different measurements used in the objective function may be weighted differently such that certain measurements may be given more importance in the final score.

The optimisation engine uses this score in step S61 to compute an improved set of parameters, based on some internal policy (which can be regularly updated as it obtains new information) or using an optimisation algorithm. The parameters are then applied to the hardware and this process repeats—ensuring that the QKD system is always operating optimally, even in the case of varying channel properties/unexpected hardware property changes.

In fact, with an appropriately designed optimisation engine, the QKD system is able to maintain performance even in the case of gradually degrading hardware. For example, optical components may degrade with time, requiring a change in biasing/setpoints to achieve the same light-matter interaction—such intrinsic component changes are automatically handled in an objective function-based approach to optimisation.

Figure 7:
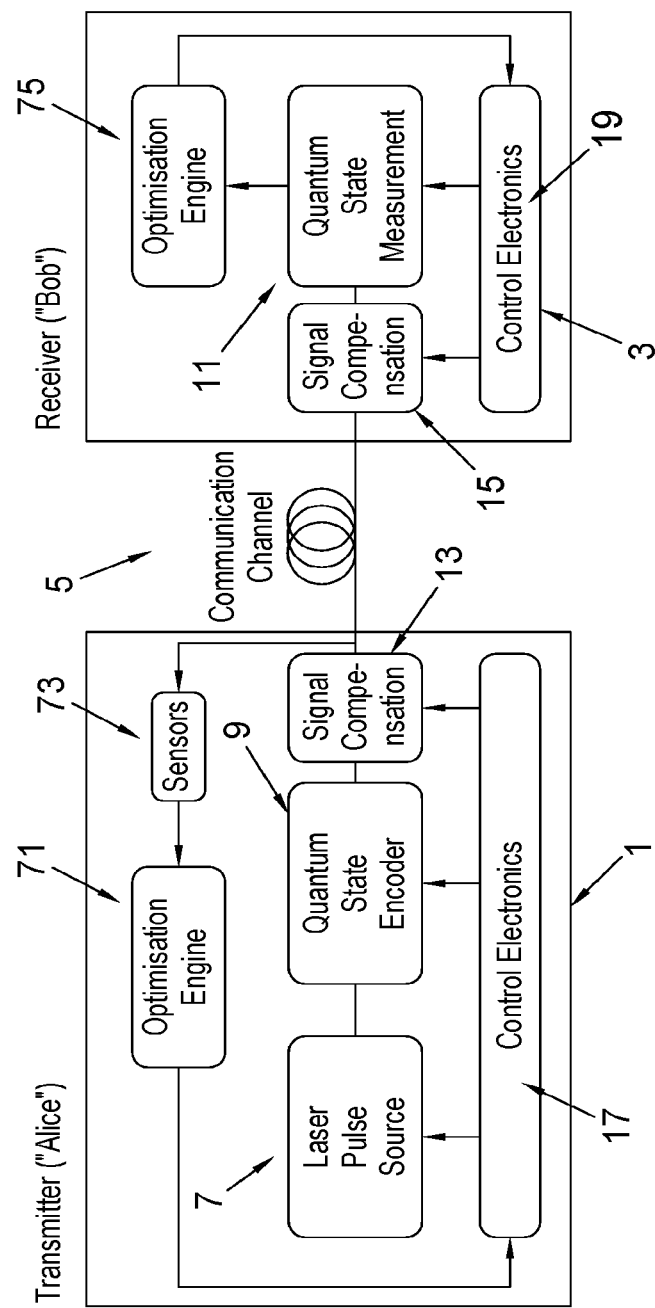
FIG. 7 is a point to point QKD system in accordance with an embodiment.

FIG. 7 is a schematic of the QKD system of FIG. 3 with the addition of further sensors and optimisation engines 71, 75 (which could be implemented in hardware or software). In the transmitter 1, further sensors 73 are provided, for example, these may be photodiodes (for time-resolved measurements of the generated light signals), optical spectrum analysers, power meters or even an interferometer followed by light detectors for measuring phase information. In the transmitter, optimisation engine 71 is provided to perform the optimisation and to tune the control parameters which are output from the control electronics 17. Some of the measurements used in the calculation of the objective function may require information from the receiver 3 which is sent to the optimisation engine 71. The receiver 3 may also have its own optimisation engine 75 which tunes control parameters to be output by the control electronics 19 of the receiver 3.

The optimisation approach may make measurements in the transmitter 1 and/or receiver 3 and then apply parameter changes in the transmitter 1 and/or receiver 3, necessitating communication between the transmitter 1 and receiver 3 nodes which may increase the time of the optimisation process. In a further embodiment, measurements may be made in the transmitter 1 and only these are used to tune the control parameters of the transmitter 1. Similarly, measurements may be made in the receiver 3 and only these are used to tune the control parameters of the receiver 3. This avoids the need for transmitter to receiver communications. Additionally, in an embodiment, settling time may be enforced between parameter setting and measurements, to avoid transient phenomena. Thus, running the optimisation may represent a time window when QKD keys cannot be generated.

The optimisation approach could be applied at various stages of the QKD system operation in fact. For example, the optimisation engine could be executed during the system initialization stage—i.e. as it turns on, then once a pre-set performance level is reached, those parameters could be fixed and the optimisation engine disabled. Alternatively, the optimisation could be stopped after a pre-set time period.

To avoid the timing of the optimisation process impinging on the ability of the system to transmit keys, in an embodiment, the optimisation process is run when QKD performance drops below a certain level (e.g. SBR falls below what is expected for a given link/QBER raises too high). In a further embodiment, the optimisation process is run periodically at some pre-determined time interval, e.g. every 10 minutes, or every hour, or every day. In a further embodiment, the trigger condition for the optimisation process is a user-selectable setting in the QKD control software.

In a further embodiment it may be possible to interleave such "performance testing" measurements with normal QKD operation. For example, consider an RF electrical signal that drives the QKD hardware. Under normal operating circumstances, the electrical signal is generated such that it drives components to modulate light to encode bits/bases as part of the QKD protocol. To test whether the amplitude of the RF signal is optimal, or some other temporal feature of it, the optimisation engine could drive the control electronics to make every Nth pulse (N could be any integer number depending on desired frequency of running this optimisation) exhibit a different amplitude. The optimisation engine could then perform measurements on these modified pulses, and score them, but leave the other pulses unaffected so they can be used for standard QKD to distil QKD keys. With this approach, the optimisation engine can identify (and perform tests to find) optimal waveform parameters without significantly impacting upon QKD operation (providing N is large . . . e.g. only using every $100^{th}$ pulse for optimisation).

The above process can use various techniques in step S61 to choose improved parameter sets based on the objective function scoring of past parameters.

In one embodiment, the optimisation engine could implement 'reinforcement learning'—a machine learning technique. In this case, part of the optimisation engine could be considered as an 'agent' which aims to maximise its reward function (the objective function output score) through applying actions to the QKD system and observing the effect Depending on the number of variables included for automatic optimisation, this could employ a neural network, or even a 'deep' neural network.

In another embodiment, the optimisation engine implements a global optimisation algorithm such as an evolutionary algorithm. This could include 'particle swarm optimisation' or a 'genetic algorithm'. The aim of such global optimsation algorithms is to find globally optimal parameters, making such algorithms ideal for non-convex problems which may contain many 'local maxima/minima'. QKD System optimisation is such a non-convex problem due to the nonlinear/coupled nature of underlying physical phenomena such as laser dynamics.

In an embodiment, a Genetic Algorithm (GAs) is used. GAs are particularly attractive here due to their relative simplicity and well-known ability to find global maxima/minima in multivariate large-parameter-space problems. In more detail, GAs are a heuristic search algorithm inspired by Darwin's theory of natural selection—the algorithm mimics the process of biological evolution to determine the 'fittest' individual to perform a given task.

Figure 8:
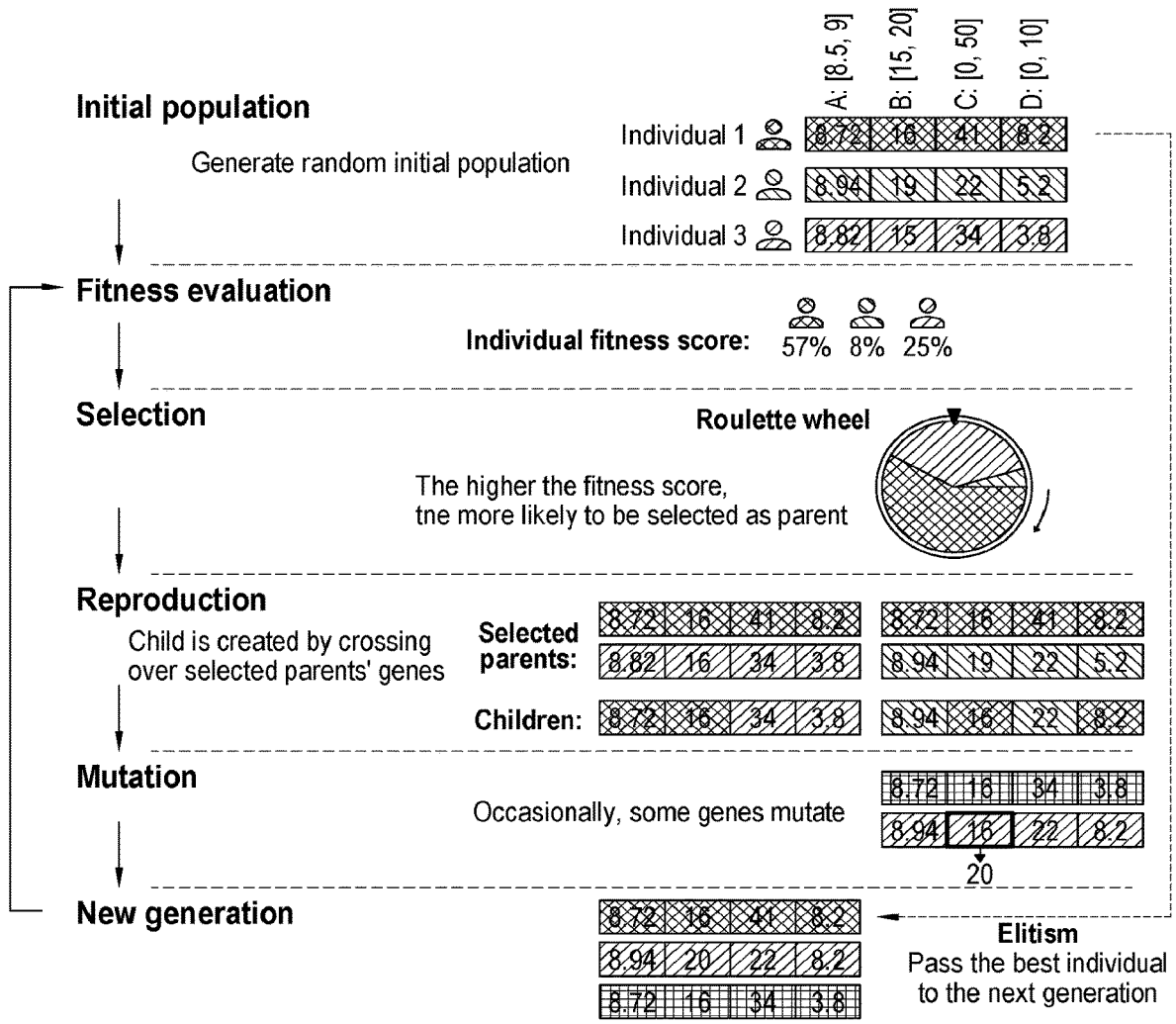
FIG. 8 is a diagram for explaining a Genetic Algorithm.

The core concept of a GA is illustrated in FIG. 8. In a GA, each possible solution (ie parameter set) is represented by an 'individual'. Each individual has a set of 'genes' which corresponds to the values for each parameter to be optimised (e.g. parameter A, B, C and D in FIG. 8). The goal is to determine the 'fittest' individual that gives the best performance.

At the beginning, a population is initialised by randomly assigning genes to the individuals. The purpose of this step is to distribute the individuals in the search space as uniformly as possible so that any promising regions can be identified quickly as they evolve. Then, the fitness of each individual in the generation is evaluated by a fitness function defined by our objective. In nature, natural selection favours individuals with traits that lead to more successful reproduction. Similarly in a GA, individuals are selected as parents with a probability based on their fitness score—the higher the score, the higher the chance to be selected as parent. A child is then produced by randomly crossing over the genes from the two parents. Having sufficient genetic diversity prevents convergence towards local optima, which can be achieved via mutation where the children's genes are randomly altered with a certain probability. Over successive generations, the population evolves by inheriting good genes and eliminating bad genes, until it converges to an optimum state. In order to speed up convergence, the concept of 'elitism' can also be applied, where the fittest individual in the population (elite) is cloned to the next generation without any modification/mutation.

Note that the probabilities for reproductive gene crossover, mutation and elitism can all be configured to give the best possible GA performance (e.g. could be user settable, or themselves set by some optimisation routine).

The above method is applied to the hardware control parameters which are not the same as the theoretical QKD protocol parameters which are quantities such as photon flux for signal/decoy states and the probabilities of choosing each state/basis.

The theoretical "QKD protocol parameters" are very different to the hardware control parameters discussed above. The QKD protocol parameters can be computed entirely theoretically based on QKD security proofs.

The above process is hardware focused and is focused on optimizing the experimental hardware and explains how this approach could be applied for a completely self-tuning QKD system (i.e. even without a pre-training step).

The optimisation engine above could be applied to any advanced optoelectronic system that requires multivariate optimisation of a difficult problem in order to achieve optimal performance. However, its application to QKD systems is very beneficial, since QKD hardware is complex and often requires precise generation, control and measurement of quantum states to function.

Figure 9:
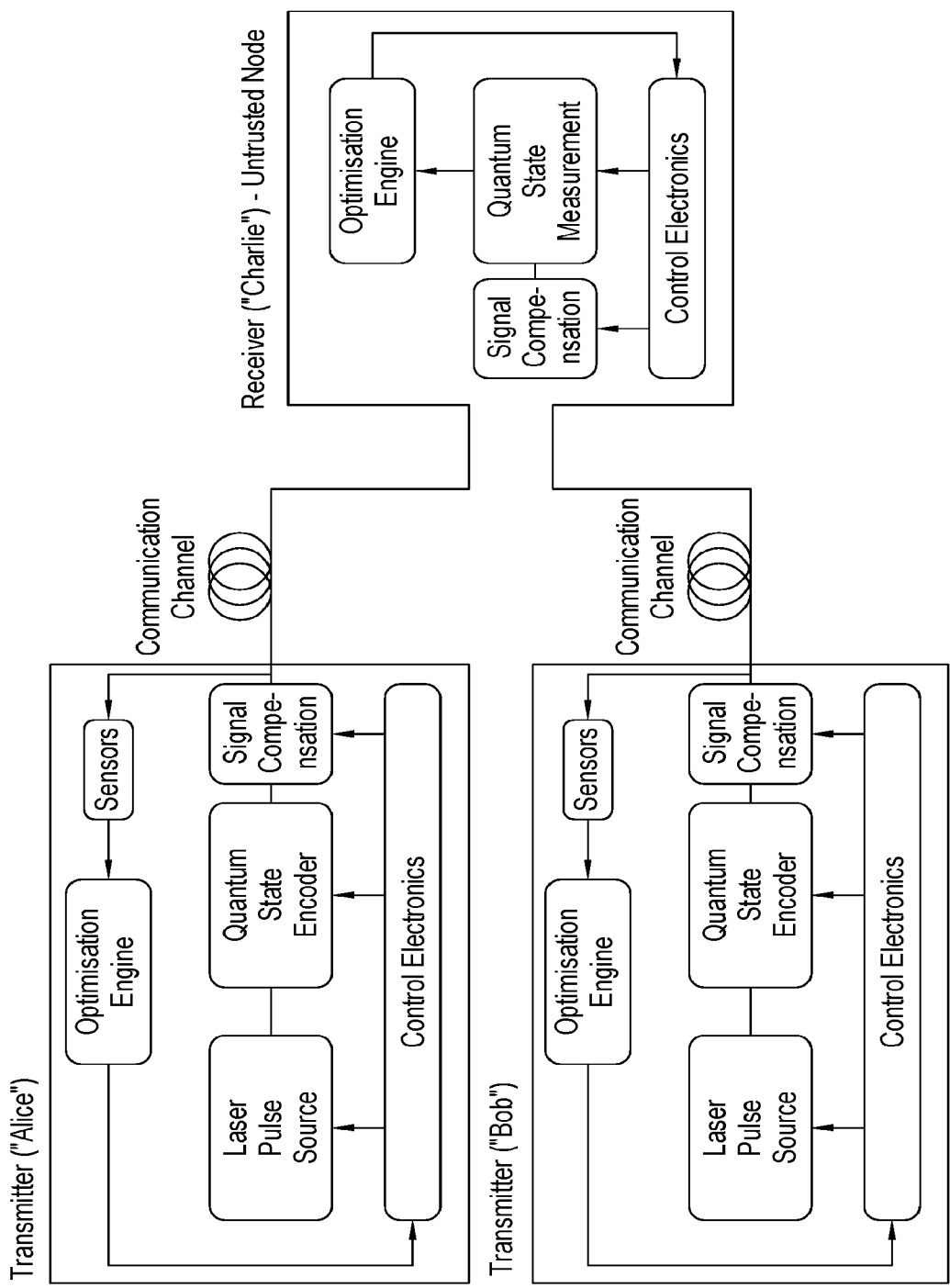
FIG. 9 is an measurement device independent QKD system in accordance with an embodiment.

The above has focused on point-to-point QKD systems. However, it should be noted that the technique could be applied to other QKD protocols/system designs. This includes CV QKD and 3-node architectures such as measurement device independent (MDI) QKD and twin field (TF) QKD (shown schematically in FIG. 9). The exact hardware arrangements for these other systems are different, but the same problem of identifying optimal driving parameters for various optoelectronic components remains. In all cases, the QBER or SBR could be used as part of the objective function (as well as other protocol-specific measurements).

As the adoption of QKD technology continues to grow, so too do the demands for more robust and reliable systems. One of the key components of a QKD system is the transmitter where the quantum states are prepared. Optical injection locking (OIL) with gain-switched laser diodes has emerged as a promising technique to realise high-speed, robust and cost-effective quantum transmitters. Such a system is described above with reference to FIGS. 4 and 5. The OIL technique improves the laser characteristics, such as a reduction in pulse timing jitter, chirping suppression and modulation bandwidth enhancement and it also enables direct phase encoding, where the phase information can be directly encoded by varying the electrical waveform applied to the lasers, thereby removing the need for conventional bulky and costly modulators. OIL has been widely applied to many QKD protocols, including BB84, coherent-one-way QKD, measurement-device-independent (MDI) QKD and Twin-field (TF) QKD. OIL also allows the transmitter to be formed on a single chip.

However, the underlying laser dynamics of an OIL system are very complex and involve the interplay between multiple control parameters. In order to achieve stable locking condition for low-noise and high-coherence outputs, one unavoidably has to optimise a number of parameters simultaneously. Furthermore, even with the same model of laser, every laser has slightly different properties, arising from natural variations and component tolerances during manufacturing. Therefore, very often the optimum parameters determined for one system cannot be directly applied to another system, necessitating the need to optimise each system individually.

Figure 10:
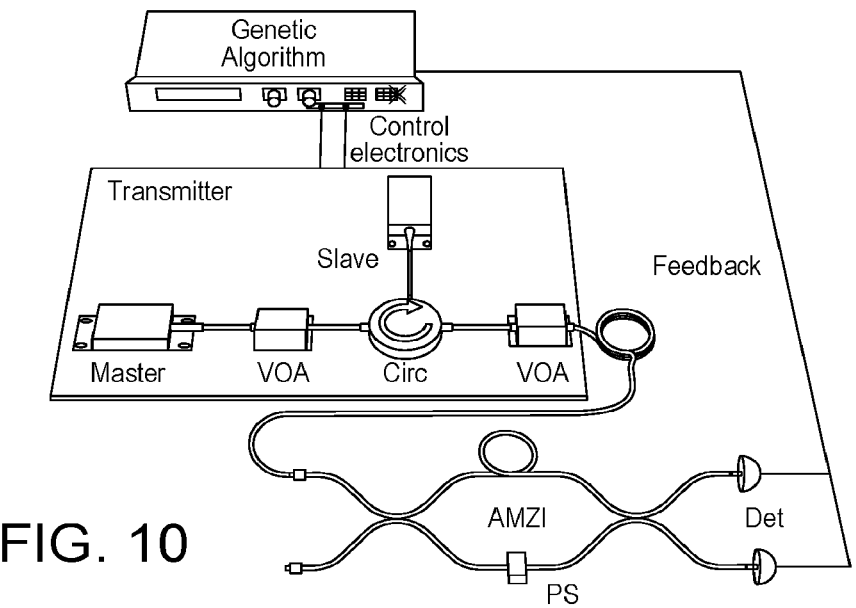
FIG. 10 is a schematic of an emitter of a QKD system in accordance with an embodiment.

FIG. 10 shows self-tuning QKD transmitters based on a GA which allow autonomous optimisation of OIL laser system which, in this embodiment, use machine intelligence. In an embodiment, the method is applied to optimise the interpulse phase coherence and the QBER for BB84 protocol.

The core concept of a GA is illustrated and described above in relation to FIG. 8. In an embodiment, the crossover rate for reproduction and mutation rate are set to the typical values of 50% and 30%, respectively. In a further embodiment, there is a 30% chance that the mutated gene will be altered to a value close to the corresponding gene of the elite in the generation. This provides an additional degree of freedom to control the exploration and exploitation of the search space.

Figure 11:
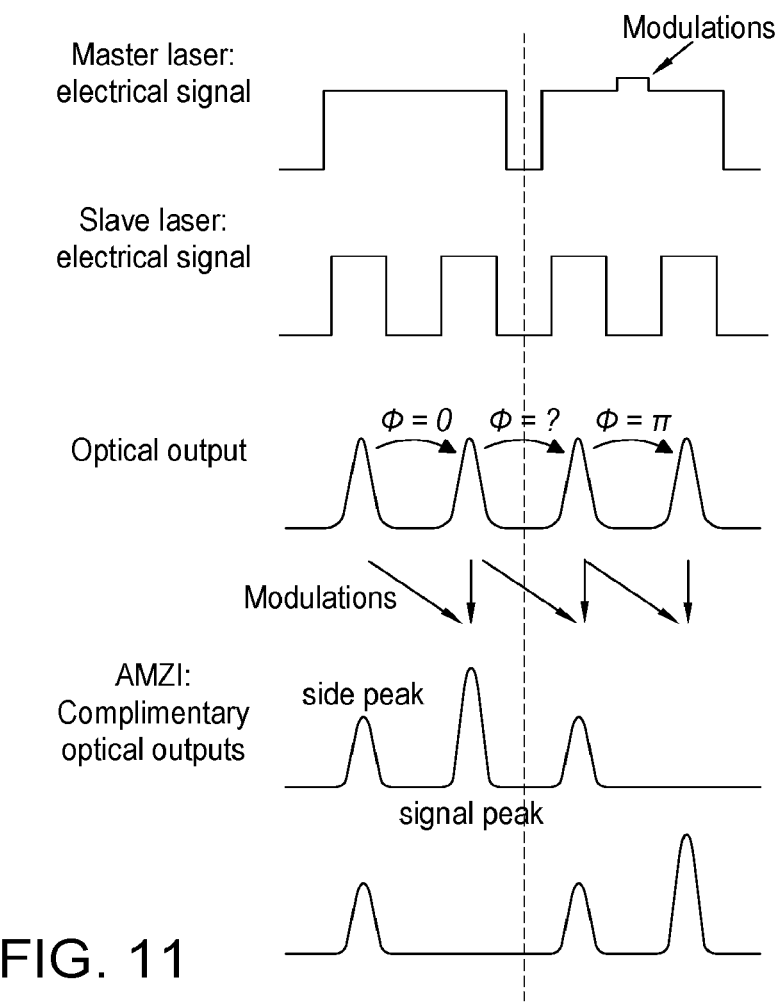
FIG. 11 is a schematic of the driving signals for the primary (master) and secondary (slave) laser and how they correspond to the optical outputs of a phase modulator.

The experimental setup is shown in FIG. 10. The transmitter comprises two distributed feedback (DFB) lasers in an OIL configuration, where light from a primary laser is injected into the cavity of a secondary laser via an optical circulator. A variable optical attenuator (VOA) is used to control the injection power. Each laser wavelength is temperature-stabilised with an integrated thermoelectric cooler which can be tuned via a controller. RF signals and DC biases from current sources are combined using bias-tees to drive the two lasers. The primary laser is gain-switched to produce a pulse train at 1 GHz. Between pulsing, the primary laser is driven below the lasing threshold to ensure that each generated pulse has a random phase. The primary laser pulses are injected into the secondary laser, which is gain-switched at 2 GHz, generating short pulses with ~70 ps duration. The RF signals of the two lasers are shown in FIG. 11. The two lasers are temporally aligned such that each primary pulse seeds two secondary laser pulses, forming the early and late time bins of a single clock cycle (i.e. a single qubit) which share the same globally random phase.

To encode a relative phase between the two secondary laser pulses, the RF signal of the primary laser is modulated by adding a small amplitude perturbation during the time interval between the secondary laser pulses. The perturbation changes the carrier density of the primary laser cavity which in turn changes its emission frequency and its phase evolution. As the secondary laser pulses are seeded by the injected primary photons, they inherit the phase of the primary pulse. The induced phase difference in the primary laser pulse is subsequently transferred onto the phase between consecutive secondary laser pulses, thereby realising direct phase encoding. The applied phase shift can be precisely controlled by changing the amplitude of the electrical perturbation signal. A VOA is used to attenuate the pulses before transmitting into the quantum channel.

In the receiver, an asymmetric Mach-Zehnder interferometer (AMZI) is used to decode the relative phase between the secondary laser pulses. The long arm of the AMZI has a delay of 500 ps that matches with the temporal separation of consecutive secondary laser pulses. Consecutive secondary laser pulses can interfere constructively or destructively depending on their relative phase, thus allowing us to assign bit '0' and '1' to the two output ports. The AMZI outputs are measured with a photodiode or single photon detectors. The GA is able to control all of the laser electronics and set the values for each parameter remotely. The output of each parameter set is then measured and acts as feedback to the algorithm for evaluation.

An example of the laser parameters which can be optimised by the GA are listed in Table I. In general, to achieve stable OIL, the injection power from the primary laser and the frequency detuning between the primary laser and the free-running secondary laser, which depend on the temperatures as well as the bias currents, need to be carefully chosen. The dynamics of OIL are more complex under gain-switching operation. It is necessary for the injection power from the primary laser to be strong enough in order to overcome the influence of spontaneous emission noise on the phase in the secondary laser; however, excessive injection light may create undesirable parasitic effects and degrade the performance. In addition, the bias current of the primary laser should be set at a level that allows the laser to be driven below the threshold between each pulse for phase randomisation, meanwhile, it also affects other crucial output properties such as the phase and duration of the pulses. To transfer the phase, the two lasers need to be temporally aligned and the duration of the primary laser pulse should be long enough to seed the generation of two consecutive secondary laser pulses. When phase modulation is considered, the implemented phase depends on the amplitude modulation applied on primary laser's driving signal. It is therefore necessary to tune all of these parameters in order to harness the benefits of OIL.

To investigate the complexity of the laser dynamics, the QBER for BB84 QKD protocol was measured as a function of the frequency detuning between the two lasers and the injection ratio (defined as the ratio between injected primary power and free-running secondary power), with all other parameters fixed at pre-determined optimum values, as shown in FIGS. 12A and 12B. The promising operating region is indicated with a box in FIG. 12A and further enlarged in FIG. 12B. While the QBER is affected by many factors, the fringes observed in FIG. 12A are likely due to the change of phase relation between the primary and the secondary lasers, which results in encoding errors in the relative phase between the secondary laser pulses. From FIG. 12B the sparseness of the optimum regime can be clearly observed. The mapping of QBER can take more than 8 hours to complete, even when limiting to two parameters. This therefore highlights the need for an efficient method to determine the optimum operating regimes, especially in a large parameter space.

Phase encoding is widely used in QKD protocols, where the secret bits are encoded in the relative phase between consecutive pulses, thus, high phase coherence between pulses contributes to the quality of the system. In addition, a key requirement for secure quantum communication is that the phase of each qubit, comprised of the early and late time bins (FIG. 11) is uniformly random. This allows the coherent state of the attenuated pulses to be treated as photon number states and security proofs against the most general attacks can be obtained.

OIL combined with gain switching represents a very efficient way to generate pulses that satisfy these requirements. As discussed above, gain switching allows each primary pulse to carry a random phase while optical injection seeding allows the phase manipulation on the primary pulse to be coherently transferred to the relative phase between consecutive secondary laser pulses.

To investigate the phase coherence, the primary laser is pulsed without additional modulation. As a result, the two secondary laser pulses seeded by the same primary pulse are in-phase, constructive and destructive interference can be obtained. In contrast, the secondary laser pulses seeded by different primary laser pulses have no definite phase relation, thus the interference should result in minimum visibility. To satisfy these conditions, the following fitness function is used in which the algorithm aims to maximise by optimising the parameters shown in Table I:

TABLE I

Input parameters for the phase coherence and QBER optimisations.

| | Phase coherence | QBER |
|---|---|---|
| 1. Temperature of slave laser | ✓ | ✓ |
| 2. DC bias of master laser | ✓ | ✓ |
| 3. DC bias of slave laser | ✓ | ✓ |
| 4. Injection power | ✓ | ✓ |
| 5. Lasers temporal delay | ✓ | ✓ |
| 6. RF modulation amplitude | | ✓ |

$$\psi_{coherence} = V_{coherent} + \frac{1}{V_{random}} \quad (1)$$

where $V_{coherent}(V_{random})$ is the interference visibility of the phase-coherent (phase-randomised) secondary laser pulses.

The result of the optimisation is shown in FIG. 13 where the performance of the best individual in the population over successive generations is plotted. The optimisation is initialised by assigning random values to the parameters from given ranges (i.e. within safe operating range). The probabilistic nature of the evolution and the random initial condition cause each optimisation to have a different trajectory. Thus, in this embodiment, the optimisation is repeated for five times in order to capture all features as well as to verify its repeatability. As expected, through evolution, the algorithm learns to operate the system and the individuals in each new generation become increasingly competent as the quality of their genes improve. As the visibility for phase-coherent pulses is improved, the visibility of the phase-randomised pulses is also simultaneously suppressed over generations. Interestingly, while sometimes the visibility increases steadily over generations (trial 2 & 4), it can also remain in local maxima for a few generations (trial 3 & 5). Due to mutation and crossover, however, the algorithm eventually discovers a better operating regime, resulting in a sudden improvement after a plateau. As a result, all trials converge towards a visibility of ~97% for phase-coherent pulses and <2% for phase-randomised pulses, matching the performance that could otherwise be achieved by tuning the transmitter manually. This shows that the algorithm is able to optimise the lasers to generate highly phase-coherent pulse pairs suitable for QKD encoding, while simultaneously ensuring each qubit has a globally random phase.

The QBER is the primary measure of the performance of a practical QKD system. Minimising the QBER has been an indispensable task for QKD operations. Here the aforementioned direct phase modulation scheme to encode random bits into the secondary laser pulses (FIG. 11) is implemented. After travelling through an optical channel with a loss of 16 dB (emulated by an VOA), the encoded pulses are decoded by the receiver AMZI and measured by the single photon detectors. A proof-of-principle BB84 QKD protocol is then performed and QBER is optimsed. As in phase coherence optimisation, it is important to take phase randomisation into account so that the QBER can be suppressed while making sure that the phase of the qubit is randomised at the same time. To achieve this, the fact is exploited that the intensity resulting from the interference between two phase-randomised pulses (referred to as side peak) is exactly half that of constructive interference between two phase-coherent pulses (referred to as signal peak), as illustrated in FIG. 11. Based on this, a phase randomisation 'cost function', LPR is defined which is to be minimised:

$$L_{PR} = \alpha \frac{|\overline{C}_{signal} - 2\overline{C}_{side}|}{\overline{C}_{signal}} \quad (2)$$

where $\overline{C}_{signal}(\overline{C}_{side})$ is the average photon counts measured from the signal peak (side peak) over an acquisition period. The scaling factor, $\alpha$ is chosen to be $\frac{1}{10}$ in order to scale the $L_{PR}$ so the contributions of phase randomisation and QBER are equally scored in the fitness function, which is defined as:

$$\psi_{QBER} = \frac{1}{QBER} + \frac{1}{L_{PR}} \quad (3)$$

Figure 14A:
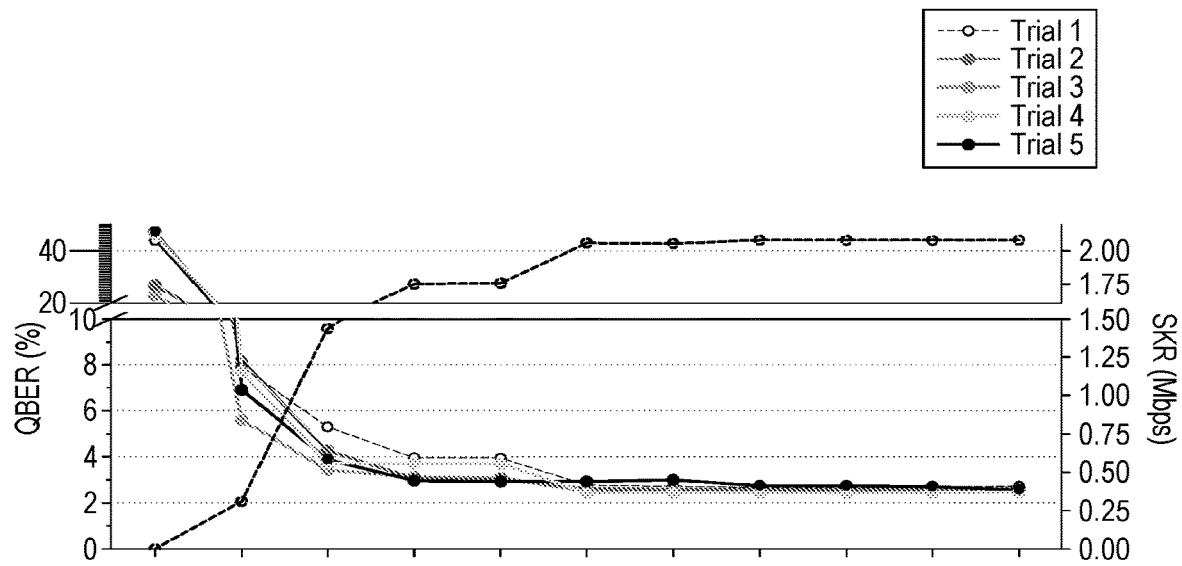
FIG. 14A is a plot showing the evolution of optimisation on (top) QBER, along with the corresponding secure key rate calculated based on the average QBER obtained over 5 trials and FIG. 14B loss function, $L_{PR}$.
Figure 14B:
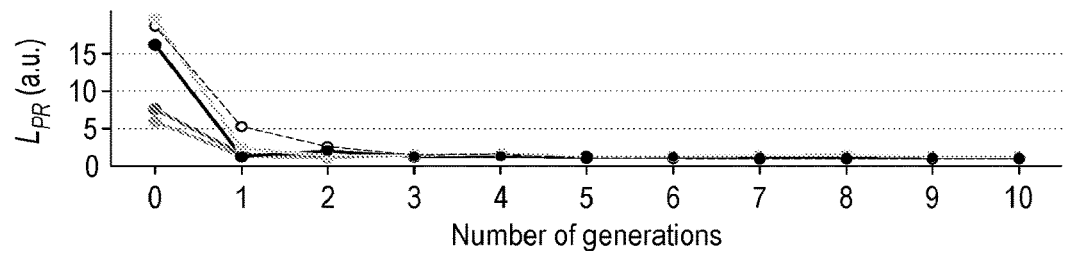
FIG. 14C shows the evolution of the population in the parameter space (only two dimensions are shown). The population size is 60 and the time taken to complete 10 generations is 2.5 hours (14 s per evaluation of individual).
Figure 14C:
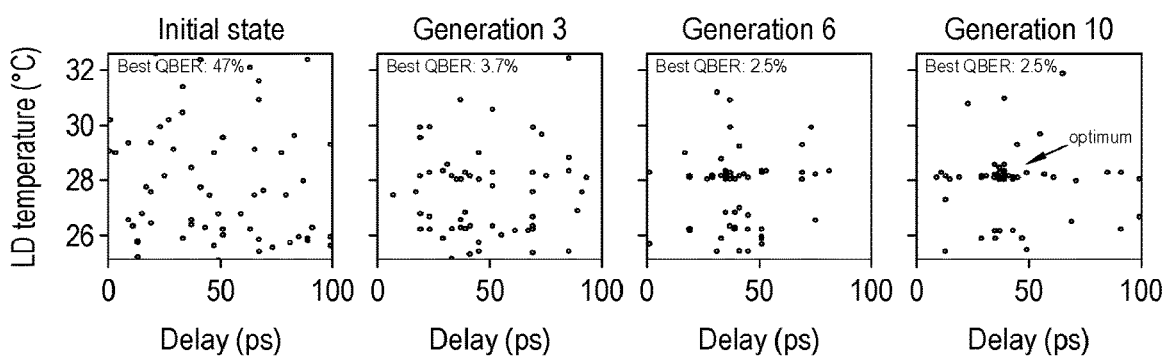
Figure 15:
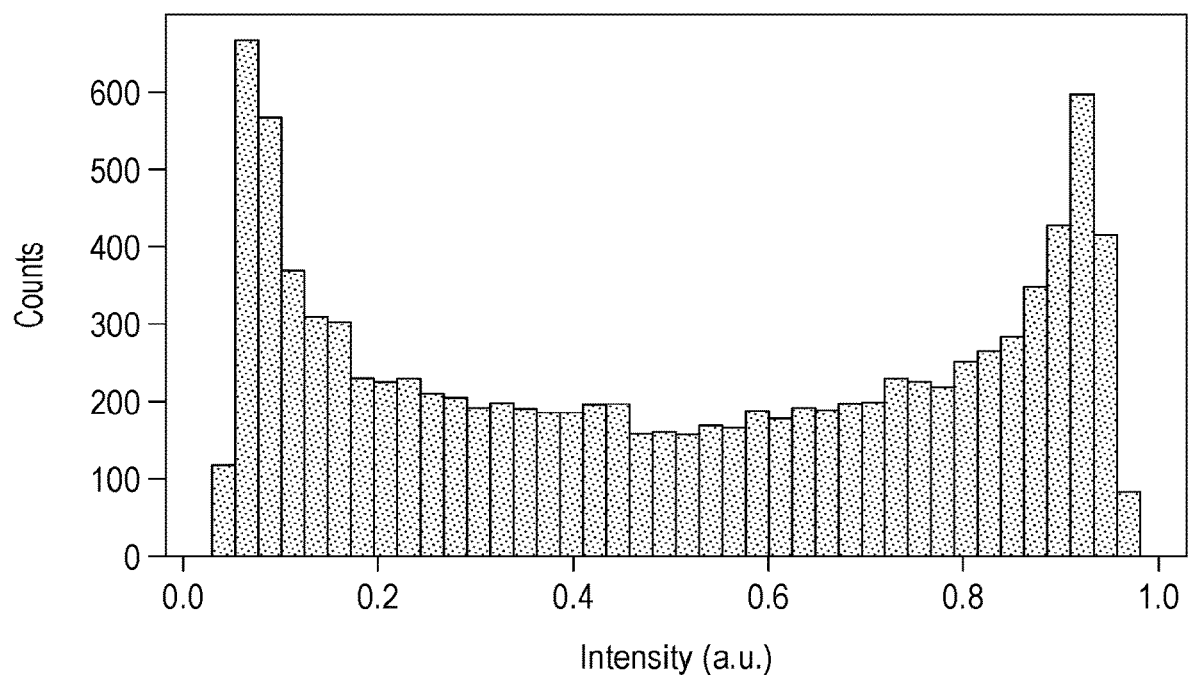
FIG. 15 is a plot showing the intensity distribution from the interference between two consecutive pulses seeded by different master laser pulses, indicating random relative phase relation.

The input parameters are listed in Table I. The evolution of the QBER and the corresponding secure key rate, and $_{LPR}$ of five repeated optimisation trials are plotted in FIGS. 14A and 14B. Similar to the phase coherence optimisation, all optimisation trials eventually locate the optimum parameters and converge towards a QBER of ~2.5%. FIG. 14C further illustrates how the population evolves during the optimisation. Starting from a random distribution in the parameter space, the individuals gradually migrate towards the optimum region over generations, while having some scatter around the parameter space to keep exploring. To verify the phase randomisation, the channel attenuation was removed and the intensity probability distribution of the outputs was measured with an oscilloscope, as shown in FIG. 15, the distribution follows the typical profile expected from the interference between two phase-randomised pulses.

In terms of the practical implementation, the above described GA-based optimisation technique can be seamlessly integrated into the software layer of QKD systems without requiring additional hardware modification. In particular, the QBER optimisation is designed to run within the QKD transmitter and receiver, without involving other diagnostic tools. Therefore, the optimisation procedure is self-contained and allows multiple QKD systems to be optimised automatically in parallel. This feature is useful in scaling up the manufacturing of the QKD systems, especially for chip-based QKD systems where the optimisation is often more challenging. For QKD systems deployed in real-world environments where testing equipment and QKD specialists are not readily available, the above process allows the QKD systems to be self-optimised in-situ in the case where the system parameters are detuned from optimum, e.g. due to various unanticipated changes in field environments, ensuring continual optimum performance. This makes the systems more robust in general and reduces any potential downtime.

Regarding the performance of the optimisation, the speed of convergence depends on the complexity of the problem at hand as well as the control parameter configuration of the genetic algorithm. In order to efficiently locate the global optima, it is necessary to have sufficient gene diversity in the populations, especially in the first generation so that the optima search does not overly rely on random mutations. Therefore, if the number of good solutions is very small compared to the size of the search space, a large population size is needed to maintain the diversity and avoid converging to local optima. However, having a larger population also inevitably increases the convergence times. It is known that the control parameter configuration is problem-dependent. In this specific embodiment, the population size for phase coherence optimisation was chosen to be 35 and expanded to 60 for QBER optimisation due to its larger parameter space. These values were empirically determined to give repeatable convergence within reasonable amount of time and further optimisation is possible but beyond the scope of this work.

Additionally, the GA-based self-tuning technique is goal-oriented. Such optimisation approach allows optimal operation to be achieved without a priori knowledge of the underlying complex dynamics.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A quantum communication system comprising:
a transmitter comprising transmitter components, the transmitter components comprising a source of pulsed radiation and a modulation unit, the modulation unit being configured to randomly encode pulses of radiation;
a receiver comprising receiver components, the receiver components comprising a demodulator and detector configured to decode and detect said randomly encoded pulses; and
a control unit and an optimisation unit, the control unit being configured to apply a plurality of control signals defined by a set of control parameters to at least one of said transmitter components and receiver components, the optimisation unit being configured to tune the set of control parameters,
wherein the optimisation unit sets the control parameters by:
obtaining a score indicating a quality of the system corresponding to a first set of control parameters, and
estimating a further set of control parameters suitable via an iterative process to obtain a tuned set of control parameters.

2. The quantum communication system of claim 1, wherein the optimisation unit is configured to obtain the score from at least one measurement indicating the quality of the system.

3. The quantum communication system of claim 2, wherein the measurements indicating the quality of the system are selected from a quantum bit error rate "QBER", a Secure bit rate "SBR", phase information of the encoded pulses, count rates for all pulses received at the detectors of the receiver, the count rates for pulses with a predetermined encoding, a shape of the received pulses, or an arrival time of the pulses at the detector.

4. The quantum communication system of claim 3, wherein the optimisation unit is configured to calculate the score from the measurements indicating the quality of the system using an objective function.

5. The quantum communication system of claim 1, further comprising sensors provided to obtain measurements indicating the quality of the system.

6. The quantum communication system of claim 1, wherein the source of pulsed radiation is provided on a temperature controlling element and wherein the control unit further provides a control signal to said temperature controlling element.

7. The quantum communication system of claim 1, wherein the control signals are electronic control signals for the source of pulsed radiation comprising at least one of: an intensity of the electronic control signal, a shape of the electronic control signal, and a DC offset of the electronic control signal.

8. The quantum communication system of claim 1, wherein the control signals are electronic control signals for the modulator comprising at least one of: an intensity of the electronic control signal, a shape of the electronic control signal, and a DC offset of the electronic control signal.

9. The quantum communication system of claim 1, wherein the control signals are electronic control signals for the demodulator comprising at least one of: an intensity of the electronic control signal, a shape of the electronic control signal, and a DC offset of the electronic control signal.

10. The quantum communication system of claim 1, wherein the control signals are electronic control signals for the detector comprising at least one of: an intensity of the electronic control signal, a shape of the electronic control signal, and a DC offset of the electronic control signal.

11. The quantum communication system of claim 1, wherein the source of pulsed radiation comprises a primary laser and a secondary laser, the primary laser being configured to apply a seeding pulse to said secondary laser.

12. The quantum communication system of claim 1, wherein the optimisation unit is configured to obtain the tuned parameters using an evolutionary algorithm.

13. The quantum communication system of claim 12, wherein the evolutionary algorithm is a genetic algorithm.

14. The quantum communication system of claim 1, wherein the optimisation unit is configured to obtain the tuned parameters using a reinforcement learning.

15. The quantum communication system of claim 11, wherein the set of control parameters comprises control parameters for both the primary laser and the secondary laser.

16. The quantum communication system of claim 1, wherein the modulation unit is a phase modulation unit comprising an interferometer.

17. The quantum communication system of claim 1, wherein the quantum communication system is selected from a point-to-point quantum communication system, a measurement device independent quantum communication system, and a twin field quantum communication system.

18. A transmitter for a quantum communication system, the transmitter comprising:
transmitter components comprising a source of pulsed radiation and a modulation unit, the modulation unit being configured to randomly encode pulses of radiation; and
a control unit and an optimisation unit, the control unit being configured to apply a plurality of control signals defined by a set of control parameters to at least one of said transmitter components, the optimisation unit being configured to tune the set of control parameters, wherein the optimisation unit sets the control parameters by:

obtaining a score indicating a quality of the system corresponding to a first set of control parameters, and estimating a further set of control parameters suitable via an iterative process to obtain a tuned set of control parameters.

19. A receiver for a quantum communication system, the receiver comprising:

receiver components, the receiver components comprising a demodulator and detector configured to decode and detect said randomly encoded pulses; and a control unit and an optimisation unit, the control unit being configured to apply a plurality of control signals defined by a set of control parameters to at least one of said receiver components, the optimisation unit being configured to tune the set of control parameters, wherein the optimisation unit sets the control parameters by:

obtaining a score indicating a quality of the system corresponding to a first set of control parameters, and estimating a further set of control parameters suitable via an iterative process to obtain a tuned set of control parameters.

20. A method of controlling a quantum communication system, the quantum communication system comprising:

a transmitter and a receiver, the transmitter comprising transmitter components, the transmitter components comprising a source of pulsed radiation and a modulation unit, the modulation unit being configured to randomly encode pulses of radiation, and a receiver comprising receiver components, the receiver components comprising a demodulator and detector configured to decode and detect said randomly encoded pulses; and the method comprising:

applying a plurality of control signals defined by a set of control parameters to at least one of said transmitter components and receiver components, obtaining a score from at least one measurement indicating a quality of the system corresponding to a first set of control parameters, and estimating a further set of control parameters suitable via an iterative process to obtain a tuned set of control parameters.

\* \* \* \* \*